(12) United States Patent
Nelson et al.

(10) Patent No.: US 11,130,689 B2
(45) Date of Patent: Sep. 28, 2021

(54) PROCESS FOR THE PREPARATION OF AN AQUEOUS SOLUTION COMPRISING AT LEAST ONE EARTH ALKALI HYDROGEN CARBONATE

(71) Applicant: Omya International AG, Oftringen (CH)

(72) Inventors: Nicholas Charles Nelson, Zürich (CH); Herbert Riepl, Gödersdorf (AT); Wolfgang Kreuger, Feistritz/Rosental (AT)

(73) Assignee: OMYA INTERNATIONAL AG, Oftringen (CH)

( * ) Notice: Subject to any disclaimer, the term of this patent is extended or adjusted under 35 U.S.C. 154(b) by 99 days.

(21) Appl. No.: 16/068,599

(22) PCT Filed: Feb. 3, 2017

(86) PCT No.: PCT/EP2017/052370
§ 371 (c)(1),
(2) Date: Jul. 6, 2018

(87) PCT Pub. No.: WO2017/134217
PCT Pub. Date: Aug. 10, 2017

(65) Prior Publication Data
US 2019/0039922 A1    Feb. 7, 2019

Related U.S. Application Data

(60) Provisional application No. 62/294,568, filed on Feb. 12, 2016.

(30) Foreign Application Priority Data

Feb. 5, 2016    (EP) .................................... 16154567

(51) Int. Cl.
*C02F 1/68* (2006.01)
*C02F 1/44* (2006.01)
(Continued)

(52) U.S. Cl.
CPC .................. *C02F 1/68* (2013.01); *A23L 2/54* (2013.01); *B01D 61/12* (2013.01); *B01D 61/14* (2013.01);
(Continued)

(58) Field of Classification Search
USPC ......................................................... 210/636
See application file for complete search history.

(56) References Cited

U.S. PATENT DOCUMENTS 2,390,095 A * 12/1945 Gloss ........................ C01F 5/24
423/165
5,346,627 A    9/1994 Siefert et al.
(Continued)

FOREIGN PATENT DOCUMENTS

CN    102826689 A    12/2012
CN    105246838 A    1/2016
(Continued)

OTHER PUBLICATIONS

International Search Report dated Apr. 3, 2017 from PCT/EP2017/052370.
(Continued)

*Primary Examiner* — Hayden Brewster
(74) *Attorney, Agent, or Firm* — Fay Sharpe LLP

(57) ABSTRACT

The present invention relates to a process for the preparation of an aqueous solution comprising at least one earth alkali hydrogen carbonate, a process for the mineralization and/or stabilization of water as well as the use of the aqueous
(Continued)

solution comprising at least one earth alkali hydrogen carbonate obtained by the process for the mineralization and/or stabilization of water.

20 Claims, 14 Drawing Sheets

(51) Int. Cl.
| | |
|---|---|
| *C02F 1/66* | (2006.01) |
| *B01D 61/14* | (2006.01) |
| *B01D 61/18* | (2006.01) |
| *A23L 2/54* | (2006.01) |
| *B01D 61/12* | (2006.01) |
| *B01D 65/02* | (2006.01) |
| *C02F 103/08* | (2006.01) |

(52) U.S. Cl.
CPC ............ *B01D 61/18* (2013.01); *C02F 1/444* (2013.01); *C02F 1/66* (2013.01); *B01D 65/02* (2013.01); *B01D 2311/04* (2013.01); *B01D 2311/06* (2013.01); *B01D 2311/08* (2013.01); *B01D 2311/12* (2013.01); *B01D 2311/18* (2013.01); *B01D 2311/243* (2013.01); *B01D 2311/246* (2013.01); *B01D 2311/25* (2013.01); *B01D 2311/268* (2013.01); *B01D 2311/2642* (2013.01); *B01D 2311/2661* (2013.01); *B01D 2321/04* (2013.01); *C02F 2103/08* (2013.01); *C02F 2209/24* (2013.01); *C02F 2303/16* (2013.01)

(56) References Cited

U.S. PATENT DOCUMENTS

| | | | |
|---|---|---|---|
| 5,914,046 | A | 6/1999 | Watten |
| 6,027,649 | A | 2/2000 | Benedek et al. |
| 7,374,694 | B2 | 5/2008 | Gaudinot et al. |
| 7,771,599 | B1 | 8/2010 | Choi et al. |
| 2001/0027950 | A1* | 10/2001 | Rabie .................... B01D 61/18 210/636 |
| 2004/0020410 | A1 | 2/2004 | Gane et al. |
| 2009/0101573 | A1 | 4/2009 | Yamasaki et al. |
| 2010/0224541 | A1 | 9/2010 | Takabatake et al. |
| 2013/0064741 | A1 | 3/2013 | Kim et al. |
| 2014/0360940 | A1 | 12/2014 | Buri et al. |
| 2015/0010458 | A1 | 1/2015 | Buri et al. |
| 2016/0130163 | A1* | 5/2016 | Poffet ...................... C02F 1/68 210/650 |

FOREIGN PATENT DOCUMENTS

| | | |
|---|---|---|
| EP | 0 421 399 A1 | 4/1991 |
| EP | 0 520 826 A1 | 12/1992 |
| EP | 1 974 806 A1 | 10/2008 |
| EP | 1 974 807 A1 | 10/2008 |
| EP | 1 975 310 B1 | 10/2008 |
| EP | 1 982 759 B1 | 10/2008 |
| EP | 2 565 165 A1 | 3/2013 |
| EP | 2 623 466 A1 | 8/2013 |
| EP | 2 623 467 A1 | 8/2013 |
| EP | 2 623 564 A1 | 8/2013 |
| EP | 2805923 A1 | 11/2014 |
| EP | 3 009 182 A1 | 4/2016 |
| WO | 98/46533 A1 | 10/1998 |
| WO | 00/39222 A1 | 7/2000 |
| WO | 2004/083316 A1 | 9/2004 |
| WO | 2006/128730 A1 | 12/2006 |
| WO | 2008/030633 A2 | 3/2008 |
| WO | 2008/030654 A1 | 3/2008 |
| WO | 2010/023742 A1 | 3/2010 |
| WO | 2012/020056 A1 | 2/2012 |
| WO | 2012/113957 A1 | 8/2012 |
| WO | 2013/014026 A1 | 1/2013 |
| WO | 2013/113614 A1 | 8/2013 |
| WO | 2013/132399 A1 | 9/2013 |
| WO | 2014/187613 A1 | 11/2014 |
| WO | 2014/187666 A1 | 11/2014 |

OTHER PUBLICATIONS

Written Opinion of the International Searching Authority dated Apr. 3, 2017 from PCT/EP2017/052370.
Liu Cao, "Manual of Urban Wastewater Treatment and Recycling Process", Beijing, China, Environmental Science Press, pp. 111-112, Section 3.3.3.2 Microfiltration.
Foray Industries, Inc., Submerged Membrane Module for MBR Toray "Membray" "TMR140 Series" Instruction Manual, 60 pages.
Bio-Cel XL, "World's largest submerged BIO-CEL ® MBR module for biological wastewater treatment", 2 pages.
International Search Report dated Mar. 13, 2017 from PCT/EP2017/052439.
Written Opinion of the International Searching Authority dated Mar. 13, 2017 from PCT/EP2017/052439.

* cited by examiner

PROCESS FOR THE PREPARATION OF AN AQUEOUS SOLUTION COMPRISING AT LEAST ONE EARTH ALKALI HYDROGEN CARBONATE

CROSS-REFERENCE TO RELATED APPLICATIONS

This is a U.S. national phase of PCT Application No. PCT/EP2017/052370, filed Feb. 3, 2017, which claims priority to U.S. Provisional Application No. 62/294,568, filed Feb. 12, 2016 and European Application No. 16154567.8, filed Feb. 5, 2016.

The present invention relates to a process for the preparation of an aqueous solution comprising at least one earth alkali hydrogen carbonate, a process for the mineralization and/or stabilization of water as well as the use of the aqueous solution comprising at least one earth alkali hydrogen carbonate obtained by the process for the mineralization and/or stabilization of water.

Drinking water has become scarce. Even in countries that are rich in water, not all sources and reservoirs are suitable for the production of drinking water, and many sources of today are threatened by a dramatic deterioration of the water quality. Initially feed water used for drinking purposes was mainly surface water and groundwater. However the treatment of sea water, brine, brackish waters, waste waters and contaminated effluent waters is gaining more and more importance for environmental and economic reasons.

In order to recover water from sea water or brackish water, for potable use, several installations and processes are known, which are of considerable importance for dry areas, coastal regions and marine islands, and such installations and processes usually comprise distillation, electrolytic as well as osmotic or reverse osmotic processes. The water obtained by such processes is very soft and has a low pH value because of the lack of pH-buffering salts, and thus, tends to be highly reactive and, unless treated, it can create severe corrosion difficulties during its distribution in conventional pipelines. Furthermore, untreated desalinated water cannot be used directly as a source of drinking water. To prevent the dissolution of undesirable substances in pipeline systems, to avoid the corrosion of water works such as pipes and valves and to make the water palatable, it is necessary to increase the mineral and alkalinity content of the water.

Conventional processes and corresponding installations that are mainly used for the mineralization of water are lime addition and dissolution with partial carbonation by carbon dioxide and limestone bed filtration, also called calcite contactors. Other, less common mineralization processes, comprise, e.g., the addition of hydrated lime and sodium carbonate, the addition of calcium sulphate and sodium hydrogen carbonate, or the addition of calcium chloride and sodium hydrogen carbonate.

The lime process involves treatment of lime solution with $CO_2$ acidified water, wherein the following reaction is involved:

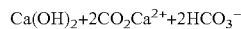
$Ca(OH)_2 + 2CO_2 \rightarrow Ca^{2+} + 2HCO_3^-$

As can be gathered from the above reaction scheme, two equivalents of $CO_2$ are necessary to convert one equivalent of $Ca(OH)_2$ into $Ca^{2+}$ and hydrogen carbonate for mineralization. This method is dependent on the addition of two equivalents of $CO_2$, in order to convert the alkaline hydroxide ions into the buffering species $HCO_3^-$. For the mineralization of water, a saturated calcium hydroxide solution, commonly named lime water, of 0.1-0.2 wt.-%, based on the total weight, is prepared from a lime milk (usually at most 5 wt.-%). Therefore, a saturator to produce the lime water must be used and large volumes of lime water are necessary to achieve the target level of mineral and alkalinity content. A further drawback of this method is that hydrated lime is corrosive and requires appropriate handling and specific equipment. Furthermore, a poorly controlled addition of hydrated lime to the soft water can lead to unwanted pH shifts due to the absence of buffering properties of lime.

The limestone bed filtration process comprises the step of passing soft water through a bed of granular limestone dissolving the calcium carbonate in the water flow. Contacting limestone with $CO_2$ acidified water mineralises the water according to:

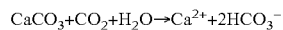
$CaCO_3 + CO_2 + H_2O \rightarrow Ca^{2+} + 2HCO_3^-$

Unlike the lime process, only one equivalent of $CO_2$ is stoichiometrically necessary to convert one equivalent of $CaCO_3$ into $Ca^{2+}$ and hydrogen carbonate for mineralization and alkalinity addition. Moreover, limestone is not corrosive and due to the buffering properties of $CaCO_3$ major pH shifts are prevented. However, as the pH increases the reaction slows down such that additional $CO_2$ has to be dosed in order to ensure enough $CaCO_3$ is dissolved. The unreacted $CO_2$ is then either removed through stripping or neutralization with sodium hydroxide.

Methods and systems for mineralization of water using lime milk or a slurry of lime are described in U.S. Pat. No. 7,374,694 and EP 0 520 826. U.S. Pat. No. 5,914,046, which describes a method for reducing the acidity in effluent discharges using a pulsed limestone bed.

U.S. Pat. No. 7,771,599 describes a method for the mineralization of process water in a desalination system. The method sequesters carbon dioxide gas from sea water or concentrate (brine) of the desalination process via a gas transfer membrane. The sequestered carbon dioxide gas is thereafter used in the production of soluble calcium hydrogen carbonate ($Ca(HCO_3)_2$). WO 2012/020056 A1 is directed toward a process for mineralization of water comprising the steps of providing feed water, and injecting gaseous carbon dioxide and a slurry into the feed water, wherein the slurry comprises micronized calcium carbonate. WO 2010/023742 A2 describes a method and apparatus for producing potable water by post-processing (post-treating) desalinated water obtained by desalination of sea water through distillation or reverse osmosis. The method includes a carbon dioxide absorption process of excessively supplying carbon dioxide into the desalinated water to absorb the carbon dioxide, a mineralization process of passing the desalinated water into which carbon dioxide is absorbed through a limestone filter in which limestone is filled to form calcium ions and hydrogen carbonate ions, and a carbon dioxide exhaust process of supplying air into the desalinated water passed through the mineralization process to exhaust the carbon dioxide with the air to obtain the potable water. WO 2012/113957 A1 relates to a method for the remineralisation of fluids, in which final turbidity is controlled. The method includes steps comprising reagent dosing, remineralisation and filtration. EP 2565165 A1 refers to a process for mineralization of water comprising the steps of providing feed water, providing an aqueous solution of calcium carbonate, wherein the aqueous solution of calcium carbonate comprises dissolved calcium carbonate and reaction species thereof, and combining the feed water and the aqueous calcium carbonate solution. EP 2623466 A1 refers to a process for the preparation of an aqueous solution comprising at least one earth alkali hydrogen carbonate and its uses. The process may be carried out in a reactor system comprising a tank equipped with a stirrer, at least one filtering device and a grinding device. EP 2623467 A1 refers to a process for the preparation of an aqueous solution comprising at least one earth alkali hydrogen carbonate and its uses. The process is carried out in a reactor system that comprises a tank equipped with a stirrer and at least one filtering device. EP 2623564 A1 relates to an installation for the purification of minerals, pigments and/or fillers and/or the preparation of precipitated earth alkali carbonate and/or mineralization of water and to the use of such an installation for the purification of minerals, pigments and/or fillers and/or mineralization of water and/or the preparation of precipitated earth alkali carbonate. WO 2013/132399 A1 refers to water mineralization which is carried out by mixing carbonate in powder form in a fast process into the water, generating $CO_2$ in the water but adding turbidity to it. The treated water is then delivered through a reactor with granular carbonate, in which the $CO_2$ in the water dissolves additional carbonate in a slow process. The reactor acts simultaneously to add further minerals as well as alkalinity to the water, and to remove the turbidity out of the water by dissolving residual powder and filtering non-dissolvable particles. CN 102826689 A1 refers to a post-treatment process of desalted seawater, comprising the following steps of: (1) adding $CO_2$ into desalted seawater and mixing sufficiently; and (2) mineralizing the desalted seawater having added $CO_2$ in a mineralizing pool; arranging a calcium carbonate filter bed in the mineralizing pool; and enabling the desalted seawater with the added $CO_2$ to pass through the calcium carbonate filter bed to be contacted and reacted sufficiently with the calcium carbonate. WO 2013/014026 A1 concerns a process for treating water and the use of calcium carbonate in such a process. In particular, it is directed to a process for remineralization of water comprising the steps of (a) providing feed water having a concentration of carbon dioxide of at least 20 mg/l, preferably in a range of 25 to 100 mg/l, and more preferably in a range of 30 to 60 mg/l, (b) providing an aqueous slurry comprising micronized calcium carbonate, and (c) combining the feed water of step (a) and the aqueous slurry of step (b) in order to obtain remineralized water. WO 2014/187666 A1 refers to a multiple batch system for the preparation of a solution of calcium hydrogen carbonate and the use of such a dual batch system for the preparation of a solution of calcium hydrogen carbonate. WO 2014/187613 A1 relates to an installation for the preparation of a solution of calcium hydrogen carbonate and the use of such an installation for the continuous preparation of a solution of calcium hydrogen carbonate as well as the use of such an installation for the remineralization of water.

US 2009/0101573 A1 refers to a waste water treatment apparatus and method, a mineral mixing tank receives biologically treated water, sludge which is generated by biological treatment, and mineral sludge which contains calcium and so on from a settling tank. A mineral pump returns the sludge and the treated water from the mineral mixing tank to a raw water tank. An air-lift pump circulates treatment water between a reaeration tank having a semi-anaerobic section and a denitrification tank. During the circulation of the treatment water between the reaeration tank and the denitrification tank, the semi-anaerobic section alleviates the change of environment for microorganisms and thereby realizes the environment required to facilitate the propagation of the microorganisms. The air-lift pump permits agitation with low energy consumption even when the microorganisms are cultured up to a high concentration thereof. WO 2006/128730 A1 describes a process for treating a feed stream of an aqueous medium of a given composition, which comprises dissolved potentially scale-forming components, in a reverse osmosis (RO) system under given process conditions, providing a permeate stream and a stream of a retentate (concentrate) which comprises potentially scale-forming components at a concentration sufficiently high to cause scale formation in those parts of the RO system being in contact with said retentate in the absence of a scale inhibitor, in which process (a) the retentate is continuously monitored to detect the presence of particles of potentially scale-forming components in said retentate and a reading of one or more physical parameters of the retentate related to the presence of such particles is continuously recorded; (b) said recorded reading is continuously compared to measurement values for said one or more parameters of a retentate obtained from an aqueous medium of the same composition under the same process conditions which values have empirically been predetermined; and (c) an amount of scale inhibitor is added to the RO system upstream of the membrane once the recorded reading for the one or more parameters differs from said predetermined measurement values, said amount of scale inhibitor having been empirically predetermined to prevent scale formation under said conditions. WO 98/46533 A1 refers to a system of purifying water to remove at least one of natural organic matter, colour, turbidity, bacteria, cysts and oocysts, viruses, arsenic compounds and insoluble impurities. The system comprises the steps of providing a body of water to be purified; controlling the pH of the body in a range of 5 to 8; and adding a coagulant to the body to provide a floc. The floc is maintained in the body in a concentration in the range of 1 to 6, for purposes of adsorbing at least one of the natural organic matter, colour, turbidity and bacteria to provide treated water. Thereafter, a first portion of the treated water and floc is removed from the body of water. U.S. Pat. No. 6,027,649 A refers to system of purifying water to remove at least one of natural organic matter, colour, turbidity, bacteria, cysts and oocysts, viruses, arsenic compounds and insoluble impurities. The system comprises the steps of providing a body of water to be purified; controlling the pH of the body in a range of 5 to 8; and adding a coagulant to the body to provide a floc. The floc is maintained in the body in a concentration in the range of 1 to 6, for purposes of adsorbing at least one of the natural organic matter, colour, turbidity and bacteria to provide treated water. Thereafter, a first portion of the treated water and floc is removed from the body of water. A submerged semi-permeable membrane is provided in the body of water for removing a second portion of the treated water. The membrane has a pore size in the range of 0.02 to 1 μm to provide a permeate comprised of purified water and to provide a retentate containing the floc. The body of water is treated by a means of mixing to minimize membrane fouling and to provide thorough mixing of the floc in the body of water. US 2010/0224541 A1 describes a fine bubble diffusing tube that can generate fine bubbles evenly and uniformly even when the diffusing tube has a long length, a fine bubble diffusing device using such a tube and a submerged membrane separation apparatus are produced. US 2013/0064741 A1 relates to a system for fixing carbon dioxide. The system comprises a first reactor for extracting alkali metal components from a slag and a second reactor for carbonating the extracted alkali metal component with carbon dioxide. With this system, carbon dioxide can be fixed in a simpler and cost-effective manner.

However, the described processes have the disadvantage that the mineralization of water and especially the preparation of an aqueous solution comprising at least one earth alkali hydrogen carbonate used for the mineralization of water show an improvable $CO_2$ efficiency and/or an excessive energy consumption.

In view of the foregoing, improving the mineralization of water still remains of interest to the skilled man. It would be especially desirable to provide an alternative or improved process for the preparation of an aqueous solution comprising at least one earth alkali hydrogen carbonate which can be prepared in a more efficient, economic and ecologic way, especially enabling an increase in the efficiency of $CO_2$ consumption for the process, and without excessive energy consumption for the process and corresponding installation.

It is thus an object of the present invention to provide a process for the preparation of an aqueous solution comprising at least one earth alkali hydrogen carbonate. Another object may also be seen in the provision of a process for the preparation of an aqueous solution comprising at least one earth alkali hydrogen carbonate that increases the efficiency of $CO_2$ consumption for the process. A further object may be seen in the provision of a process for the preparation of an aqueous solution comprising at least one earth alkali hydrogen carbonate enabling a decrease in overall energy consumption for the process and corresponding installation. Another object may be seen in the provision of a process for the preparation of an aqueous solution comprising at least one earth alkali hydrogen carbonate in which the sludge production is decreased compared to a typical lime system of the prior art.

One or more of the foregoing and other problems are solved by the subject-matter as defined herein in the independent claims. Advantageous embodiments of the present invention are defined in the corresponding sub-claims.

A first aspect of the present invention relates to a process for the preparation of an aqueous solution comprising at least one earth alkali hydrogen carbonate. The process comprises the steps of:
  a) providing water;
  b) providing at least one earth alkali carbonate-comprising material;
  c) providing $CO_2$ or an acid having a $pK_a$-value <5;
  d) combining the water of step a) with the at least one earth alkali carbonate-comprising material of step b) and the $CO_2$ or acid of step c) in any order such as to obtain an aqueous suspension S1 comprising at least one earth alkali hydrogen carbonate;
  e) filtering at least a part of the aqueous suspension S1 obtained in step d) by passing the aqueous suspension S1 through at least one submerged membrane module in order to obtain an aqueous solution S2 comprising at least one earth alkali hydrogen carbonate, wherein the at least one submerged membrane module is located in a container.

According to a further aspect of the present invention, a process for the mineralization and/or stabilization of water is provided, the process comprises the steps of:
  i) providing water to be mineralised,
  ii) providing an aqueous solution comprising at least one earth alkali hydrogen carbonate obtained by the process as defined herein,
  iii) combining the water to be mineralised of step (i) and the aqueous solution comprising at least one earth alkali hydrogen carbonate of step (ii) in order to obtain mineralised water.

According to one embodiment of the present process for the mineralization of water, the process comprises a further step (iv) of adding a base, preferably sodium hydroxide or calcium hydroxide, to the mineralised water of step (iii).

According to another aspect of the present invention, the use of an aqueous solution comprising at least one earth alkali hydrogen carbonate obtained by the process, as described herein, for the mineralization and/or stabilization of water or as mineralised water is provided. According to one embodiment of the present use, the water is desalinated or naturally soft water.

According to one embodiment of the present process, step d) comprises the steps of i1) combining the water of step a) with the $CO_2$ or acid of step c), and i2) combining the mixture of i1) with the at least one earth alkali carbonate-comprising material of step b); or ii1) combining the water of step a) with the at least one earth alkali carbonate-comprising material of step b), and ii2) combining the mixture of ii1) with the $CO_2$ or acid of step c).

According to another embodiment of the present process, process steps d) and e) are carried out in the same container, preferably in a reactor tank.

According to yet another embodiment of the present process, the at least one submerged membrane module has a pore size preferably <1 μm, and more preferably <0.1 μm.

According to one embodiment of the present process, air or process fluid is recirculated across at least a part of the surface of the at least one submerged membrane module, preferably from the bottom to top direction of the at least one submerged membrane module and/or container, more preferably $CO_2$ or acid of step c) is added to the air or process fluid.

According to another embodiment of the present process, the container is sealed and the air at the top of the container is used as the feed and reintroduced at the bottom of the container.

According to yet another embodiment of the present process, the process comprises a further step f) of backwashing the at least one submerged membrane module with water, optionally $CO_2$ or an acid having a $pK_a$-value <5 is added to the water.

According to one embodiment of the present process, the at least one earth alkali carbonate-comprising material of step b) is selected from the group consisting of precipitated calcium carbonate, modified calcium carbonate, ground calcium carbonate and mixtures thereof, preferably the at least one earth alkali carbonate-comprising material in step b) is ground calcium carbonate.

According to another embodiment of the present process, the at least one earth alkali carbonate-comprising material of step b) is ground calcium carbonate being selected from the group consisting of marble, limestone, chalk and mixtures thereof.

According to yet another embodiment of the present process, the at least one earth alkali carbonate-comprising material of step b) is provided in dry form or in form of an aqueous suspension; and/or the at least one earth alkali hydrogen carbonate obtained in step d) comprises calcium hydrogen carbonate and preferably consists of calcium hydrogen carbonate.

According to one embodiment of the present process, the acid provided in step c) has a $pK_a$-value <4 and/or the acid is selected from the group consisting of sulphuric acid, hydrochloric acid, nitric acid or citric acid and/or mixtures thereof.

According to another embodiment of the present process, the aqueous solution S2 comprising at least one earth alkali hydrogen carbonate obtained in step e) has an earth alkali concentration as earth alkali hydrogen carbonate in the range from 20 to 1 000 mg/l and more preferably from 50 to 600 mg/l and most preferentially from 80 to 400 mg/l; and/or has a pH-value in the range from 6.1 to 8.9 and preferably in the range from 6.5 to 8.5.

It should be understood that for the purpose of the present invention the following terms have the following meaning.

The term "earth alkali carbonate-comprising material" may refer to a material that comprises at least 50.0 wt.-% earth alkali carbonate, based on the total dry weight of the earth alkali carbonate-comprising material.

A "calcium carbonate-comprising material" in the meaning of the present invention refers to a material which is a source of calcium carbonate and preferably is selected from ground calcium carbonate, precipitated calcium carbonate, surface-reacted calcium carbonate, dolomite and mixtures thereof.

The term "mineralization" as used in the present invention refers to the increase of both essential mineral ions and alkalinity in water that is not containing minerals or alkalinity at all, or in insufficient amounts such that the water is palatable.

A mineralization can be achieved by adding at least the specific earth alkali carbonate, such as calcium carbonate, as raw material only to the water to be treated. Optionally, e.g., for health-related benefits to ensure the appropriate intake of some essential minerals and trace elements, further substances such as magnesium salts can be mixed into or with the earth alkali carbonate, such as calcium carbonate, and then added to the water during the mineralization process. According to the national guidelines on human health and drinking water quality, the mineralised product can comprise additional minerals selected from the group comprising potassium or sodium, magnesium sulphate, potassium hydrogen carbonate, sodium hydrogen carbonate or other minerals containing essential trace elements and mixtures thereof. Preferably, the mineralised product comprises additional minerals selected from the group comprising magnesium sulphate, potassium hydrogen carbonate, sodium hydrogen carbonate and mixtures thereof.

The term "stabilization" as used in the present invention refers to the increase of the mineral content and alkalinity, to the neutralization or removal of remaining "aggressive" carbon dioxide and/or to the increase of the pH to achieve a stable and balanced final water quality. The stabilization is preferably achieved by stripping the aggressive carbon dioxide, adding a base to the mineralised water obtained by the inventive installation, or a combination of both.

The expression "$CO_2$ efficiency" in the meaning of the present invention refers to the ratio of $CO_2$ in the process, both initially within the feed water provided in step (a) and the additional $CO_2$ provided in step (c) (measured in mmol/l), to the amount of earth alkali carbonate (provided in step (b)) that is converted into earth alkali hydrogen carbonate (measured in mmol/l) as the increase of earth alkali carbonate from the feed water provided in step (a) to the aqueous solution S2 produced in step (e)).

In the meaning of the present invention, the expressions "acidified" or "acid" refer to the Brønsted-Lowry theory, and thus refers to $H_3O^+$ ion-provider. Furthermore, the pH-value of an acid can be >7, such as in the range from >7 to 7.5, as long as a suitable corresponding base is available for accepting the $H_3O^+$ ion as donated by the acid.

For the purpose of the present application, the "$pK_a$-value" represents the acid dissociation constant associated with a given ionisable hydrogen in a given acid, and is indicative of the natural degree of dissociation of this hydrogen from this acid at equilibrium in water at a given temperature. Such $pK_a$ values may be found in reference textbooks such as Harris, D. C. "Quantitative Chemical Analysis: $3^{rd}$ Edition", 1991, W.H. Freeman & Co. (USA), ISBN 0-7167-2170-8. The $pK_a$-value can be determined according to methods of the prior art, which are well known to the skilled person. The $pK_a$-value of an acid is depending on the temperature, unless expressly stated otherwise the $pK_a$-values according to the present invention refer to a temperature of 25° C.

Where the term "comprising" is used in the present description and claims, it does not exclude other elements. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" though such a limited understanding is always included by the terms "obtained" or "defined" as a preferred embodiment.

In the following, the details and preferred embodiments of the inventive process for the preparation of an aqueous solution comprising at least one earth alkali hydrogen carbonate will be described in more detail. It is to be understood that these technical details and embodiments also apply to the inventive process for the mineralization and/or stabilization of water and use, as far as applicable.

The process of the present invention is for the preparation of an aqueous solution comprising at least one earth alkali hydrogen carbonate. In particular, the process of the present invention is for the preparation of an aqueous solution comprising at least one earth alkali hydrogen carbonate which is suitable for the mineralization and/or stabilization of water.

The term "aqueous" solution refers to a system, wherein the aqueous solvent comprises, preferably consists of, water. However, said term does not exclude that the aqueous solvent comprises minor amounts of at least one water-miscible organic solvent selected from the group comprising methanol, ethanol, acetone, acetonitrile, tetrahydrofuran and mixtures thereof. Preferably, the aqueous solvent comprises water in an amount of at least 80.0 wt.-%, preferably at least 90.0 wt.-%, more preferably at least 95.0 wt.-%, even more preferably at least 99.0 wt.-%, based on the total weight of the aqueous solvent. For example, the aqueous solvent consists of water.

The term aqueous "solution" in the meaning of the present invention refers to a system comprising aqueous solvent and particles of earth alkali carbonate and/or earth alkali hydrogen carbonate, wherein the particles of the earth alkali carbonate and/or earth alkali hydrogen carbonate are dissolved in the aqueous solvent. The term "dissolved" in the meaning of the present invention refers to systems in which no discrete solid particles are observed in the aqueous solvent.

The term "at least one" earth alkali hydrogen carbonate in the meaning of the present invention means that the earth alkali hydrogen carbonate comprises, preferably consists of, one or more earth alkali hydrogen carbonate(s).

In one embodiment of the present invention, the at least one earth alkali hydrogen carbonate comprises, preferably consists of, one earth alkali hydrogen carbonate. Alternatively, the at least one earth alkali hydrogen carbonate comprises, preferably consists of, two or more earth alkali hydrogen carbonates. For example, the at least one earth alkali hydrogen carbonate comprises, preferably consists of, two earth alkali hydrogen carbonates.

Preferably, the at least one earth alkali hydrogen carbonate comprises, more preferably consists of, one earth alkali hydrogen carbonate.

In one embodiment of the present invention, the at least one earth alkali hydrogen carbonate is selected from the group consisting of calcium hydrogen carbonate, magnesium hydrogen carbonate and mixtures thereof. Preferably, the at least one earth alkali hydrogen carbonate comprises, preferably consists of, calcium hydrogen carbonate.

Step a): Provision of Water

According to step a) of the inventive process, water is provided.

The water provided in step a) can be derived from various sources and can be selected from amongst distilled water, tap water, industrial water, desalinated water such as desalinated sea water, brackish water, treated wastewater, water treated via reverse osmosis, or naturally soft water such as ground water, surface water or rainfall. It can also contain between 10 and 2 000 mg/l NaCl. Preferably, the water provided in step a) is desalinated water, e.g. permeate or distillate obtained from a desalination process.

In one embodiment of the inventive process, the water provided in step a) is water to be mineralised. That is to say, the water provided in step a) is water that does not contain minerals or alkalinity at all or in insufficient amounts.

The water provided in step a) can be pretreated. A pretreatment can be necessary, e.g., in case the water is derived from surface water, groundwater or rainwater. For example, to achieve the drinking water guidelines the water needs to be treated through the use of chemical or physical techniques in order to remove pollutants such as organics and undesirable minerals. For example, ozonising can be used as a first pretreatment step, followed then by coagulation, flocculation, or decantation as a second treatment step. For example, iron(III) salts such as $FeClSO_4$ or $FeCl_3$, or aluminium salts such as $AlCl_3$, $Al_2(SO_4)_3$ or polyaluminium can be used as flocculation agents. The flocculated materials can be removed from the water, e.g., by means of sand filters or multi-layered filters. Further water purification processes that can be used to pretreat the water are described, e.g., in EP 1 975 310, EP 1 982 759, EP 1 974 807, or EP 1 974 806.

If sea water or brackish water is provided in step a), the sea water or brackish water is firstly pumped out of the sea by open ocean intakes or subsurface intakes such as wells, and then it undergoes physical pretreatments such as screening, sedimentation or sand removal processes. Depending on the required water quality, additional treatment steps such as coagulation and flocculation can be necessary in order to reduce potential fouling on the membranes. The pretreated sea water or brackish water can then be distilled, e.g., using multiple stage flash, multiple effect distillation, or membrane filtration such as nanofiltration or reverse osmosis, to remove the remaining particulates and dissolved substances.

It is to be noted that the water provided in step a) is preferably provided in a main process flow (17) and in at least one side stream (15).

That is to say, a part of the water provided in step a) forms the main process flow (17) and the remaining part of the water becomes the at least one side stream (15). Thus, the main process flow (17) and the at least one side stream (15) are connected to each other, preferably in that the at least one side stream (15) is connected to the main process flow (17) by its inlet and outlet.

In one embodiment, the at least one side stream (15) can comprise a main branch of the side stream (15a) and one or more side branches of the side stream (15b). For example, the at least one side stream (15) can be branched into a side branch of the side stream (15b) providing water for the preparation of the aqueous suspension S1 and a main branch of the side stream (15a) providing water for diluting the aqueous suspension S1 prepared in the side branch of the side stream (15b). In other words, the side branch of the side stream (15b) provides water for the aqueous suspension S1, whereas the main branch of the side stream (15a) provides water directly in the container, preferably reactor tank (1).

The term "at least one" side stream means that one or more side process flows can be provided in the inventive process.

In one embodiment of the present invention, the process comprises, preferably consists of, the main process flow (17) and one side stream (15). Alternatively, the process comprises, preferably consists of, the main process flow (17) and two or more side streams (15a), (15b), etc. Preferably, the process comprises, more preferably consists of, the main process flow (17) and one side stream (15). Alternatively, the water provided in step a) is provided in the main process flow (17) only. That is to say, this process does not comprise at least one side stream. Thus, in one embodiment the process comprises, preferably consists of, the main process flow (17).

In one embodiment, the main process flow (17) can comprise a main branch of the main process flow (17a) and one or more side branches of the main process flow (17b). For example, the at least main process flow (17) can be branched into a side branch of the main process flow (17b) providing water for the preparation of the aqueous suspension S1 and a main branch of the main process flow (17a) providing water for diluting the aqueous suspension S1 prepared in the side branch of the main process flow (17b). In other words, the side branch of the main process flow (17b) provides water for the aqueous suspension S1, whereas the main branch of the main process flow (17a) provides water directly in the container, preferably reactor tank (1).

It is to be noted that a side branch is considered as side branch of the main process flow (17b) if the main branch of the main process flow (17a) and the one or more side branches are merged together before the aqueous suspension S1 is directed into the container, preferably reactor tank (1). That is to say, the aqueous suspension S1 is prepared in the side branch of the main process flow (17b) and then directed into the main branch of the main process flow (17a), e.g. for diluting the aqueous suspension S1, and then the diluted aqueous suspension S1 is directed via the main branch of the main process flow (17a) into the container, preferably reactor tank (1).

A side stream (15) is considered as side stream (15) if the one or more side streams (15) and the main process flow (17) are merged together after the aqueous solution S2 comprising at least one earth alkali hydrogen carbonate is released from the container, preferably reactor tank (1).

Step b): Provision of at Least One Earth Alkali Carbonate-Comprising Material

According to step b) of the inventive process, at least one earth alkali carbonate-comprising material is provided.

The term "at least one" earth alkali carbonate-comprising material in the meaning of the present invention means that the earth alkali carbonate-comprising material comprises, preferably consists of, one or more earth alkali carbonate-comprising material(s).

In one embodiment of the present invention, the at least one earth alkali carbonate-comprising material comprises, preferably consists of, one earth alkali carbonate-comprising material. Alternatively, the at least one earth alkali carbonate-comprising material comprises, preferably consists of, two or more earth alkali carbonate-comprising materials. For example, the at least one earth alkali carbonate-comprising material comprises, preferably consists of, two or three earth alkali carbonate-comprising materials, more preferably two earth alkali carbonate-comprising materials.

Preferably, the at least one earth alkali carbonate-comprising material comprises, more preferably consists of, one earth alkali carbonate-comprising material.

For example, the at least one earth alkali carbonate-comprising material comprises, more preferably consists of, a calcium carbonate-comprising material.

According to one embodiment of the inventive process, the at least one earth alkali carbonate-comprising material in step b), preferably the calcium carbonate-comprising material, is selected from the group consisting of precipitated calcium carbonate, modified calcium carbonate, ground calcium carbonate and mixtures thereof.

Preferably, the at least one earth alkali carbonate-comprising material in step b), preferably the calcium carbonate-comprising material, is ground calcium carbonate.

"Ground calcium carbonate (GCC)" in the meaning of the present invention is a calcium carbonate obtained from natural sources including marble, chalk or limestone, and processed through a treatment such as grinding, screening and/or fractionizing by wet and/or dry, for example, by a cyclone.

"Precipitated calcium carbonate (PCC)" in the meaning of the present invention is a synthesized material, generally obtained by precipitation following the reaction of carbon dioxide and lime in an aqueous environment or by precipitation of a calcium and carbonate source in water or by precipitation of calcium and carbonate ions, for example $CaCl_2$ and $Na_2CO_3$, out of solution. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like forms.

"Modified calcium carbonate" in the meaning of the present invention is a surface-reacted natural calcium carbonate that is obtained by a process where natural calcium carbonate is reacted with one or more $H_3O^+$ ion donors having a $pK_a$ at 25° C. of 2.5 or less and with gaseous $CO_2$ formed in situ and/or coming from an external supply, and optionally in the presence of at least one aluminium silicate and/or at least one synthetic silica and/or at least one calcium silicate and/or at least one silicate of a monovalent salt such as sodium silicate and/or potassium silicate and/or lithium silicate, and/or at least one aluminium hydroxide and/or at least one sodium and/or potassium silicate. Further details about the preparation of the surface-reacted natural calcium carbonate are disclosed in WO 00/39222, WO 2004/083316 and US 2004/0020410 A1, the contents of these references herewith being included in the present patent application.

The earth alkali carbonate-comprising material, preferably the calcium carbonate-comprising material, is preferably a ground calcium carbonate (GCC).

For example, the at least one earth alkali carbonate-comprising material of step b), preferably the calcium carbonate-comprising material, is selected from the group comprising marble, limestone, chalk, half burnt lime, burnt lime, dolomitic limestone, calcareous dolomite, half burnt dolomite, burnt dolomite, and precipitated earth alkali carbonates such as precipitated calcium carbonate, for example of calcitic, aragonitic and/or vateritic mineral crystal structure, for example from water de-hardening by the addition of $Ca(OH)_2$. The use of marble, limestone and/or chalk is preferred because they are naturally occurring minerals and the turbidity of the final drinking water quality is guaranteed by using a clear aqueous solution comprising at least one earth alkali hydrogen carbonate that is produced using these naturally occurring minerals. Natural marble deposits are mostly containing acid insoluble silicate impurities. However, such acid insoluble, sometimes coloured silicates do not affect the final water quality with respect of turbidity when using the product that is prepared by the inventive process.

Thus, it is preferred that the at least one earth alkali carbonate-comprising material of step b), preferably the calcium carbonate-comprising material, is ground calcium carbonate (GCC) being selected from the group consisting of marble, limestone, chalk and mixtures thereof.

According to one embodiment of the present invention, the at least one earth alkali carbonate-comprising material comprises, preferably consists of, particles consisting of earth alkali carbonate in an amount of $\geq 40.0$ wt.-%, preferably of 90.0 wt.-%, more preferably of $\geq 95.0$ wt.-% and most preferably of $\geq 97.0$ wt.-%, based on the total dry weight of the at least one at least one earth alkali carbonate-comprising material.

For example, the at least one calcium carbonate-comprising material comprises, preferably consists of, particles consisting of calcium carbonate in an amount of $\geq 40.0$ wt.-%, preferably of 90.0 wt.-%, more preferably of $\geq 95.0$ wt.-% and most preferably of $\geq 97.0$ wt.-%, based on the total dry weight of the at least one at least one calcium carbonate-comprising material.

It is further preferred that the at least one earth alkali carbonate-comprising material of step b) is a micronized earth alkali carbonate-comprising material, preferably calcium carbonate-comprising material.

For the purpose of the present invention, the term "micronized" refers to a particle size in the micrometre range, e.g., a particle size from 0.1 to 50.0 μm. The micronized particles can be obtained by techniques based on friction and/or impact, e.g., milling or grinding either under wet or dry conditions. However, it is also possible to produce the micronized particles by any other suitable method, e.g., by precipitation, rapid expansion of supercritical solutions, spray drying, classification or fractionation of natural occurring sands or muds, filtration of water, sol-gel processes, spray reaction synthesis, flame synthesis or liquid foam synthesis.

For example, the at least one earth alkali carbonate-comprising material of step b), preferably the calcium carbonate-comprising material, has a weight median particle size $d_{50}$ from 0.1 to 50.0 µm, preferably from 0.2 to 25.0 µm, more preferably from 0.3 to 10.0 µm, and most preferably from 0.5 to 5.0 µm.

Throughout the present document, the "particle size" of an earth alkali carbonate-comprising material and other materials is described by its distribution of particle sizes. Herein, the value $d_x$ represents the diameter relative to which x % by weight of the particles have diameters less than $d_x$. This means that, for example, the $d_{20}$ value is the particle size at which 20 wt.-% of all particles are smaller than that particle size. The $d_{50}$ value is thus the weight median particle size, i.e. 50 wt.-% of all grains are bigger and the remaining 50 wt.-% are smaller than this particle size. For the purpose of the present invention the particle size is specified as weight median particle size $d_{50}$ unless indicated otherwise. The $d_{98}$ value is the particle size at which 98 wt.-% of all particles are smaller than that particle size. Particle sizes were determined by using a Sedigraph™ 5100 or 5120 instrument of Micromeritics Instrument Corporation. The method and the instrument are known to the skilled person and are commonly used to determine the particle size of fillers and pigments. The measurements were carried out in an aqueous solution of 0.1 wt.-% $Na_4P_2O_7$. The samples were dispersed using a high speed stirrer and sonicated.

In one embodiment of the instant invention, the earth alkali carbonate-comprising material of step b), preferably the calcium carbonate-comprising material, has a BET specific surface area of from 0.01 to 200.0 m$^2$/g, and preferably of from 1.0 to 100.0 m$^2$/g, measured by nitrogen gas adsorption using the BET isotherm (ISO 9277:2010).

Additionally or alternatively, the at least one earth alkali carbonate-comprising material of step b), preferably the calcium carbonate-comprising material, can comprise an HCl insoluble content from 0.02 to 50.0 wt.-%, 0.03 to 25.0 wt.-%, or 0.05 to 10.0 wt.-%, based on the total weight of the at least one earth alkali carbonate-comprising material of step b), preferably the calcium carbonate-comprising material. Preferably, the HCl insoluble content of the at least one earth alkali carbonate-comprising material does not exceed 1.0 wt.-%, based on the total weight of the calcium carbonate. The HCl insoluble content can be, e.g., minerals such as quartz, silicate or mica.

The at least one earth alkali carbonate-comprising material in step b), preferably the calcium carbonate-comprising material, is provided in dry form or in aqueous form.

If the at least one earth alkali carbonate-comprising material in step b), preferably the calcium carbonate-comprising material, is added in dry form, the at least one earth alkali carbonate-comprising material, preferably the calcium carbonate-comprising material, can be in form of a powder or in granular form.

The term "dry" with regard to the at least one earth alkali carbonate-comprising material, preferably the calcium carbonate-comprising material, is understood to be a material having less than 0.3% by weight of water relative to the weight of the at least one earth alkali carbonate-comprising material. The % water is determined according to the Coulometric Karl Fischer measurement method, wherein the at least one earth alkali carbonate-comprising material is heated to 220° C., and the water content released as vapour and isolated using a stream of nitrogen gas (at 100 ml/min) is determined in a Coulometric Karl Fischer unit.

If the at least one earth alkali carbonate-comprising material of step b) is provided in dry form, the dry earth alkali carbonate-comprising material can be dosed into a slurry make-down system which is then combined with the water in step d). Alternatively, the dry earth alkali carbonate-comprising material is combined with the water in step d). For example, the dry earth alkali carbonate-comprising material is combined with the water in a container, preferably in a reactor tank (1), or in that the dry earth alkali carbonate-comprising material is dosed into a stream of the water.

If the at least one earth alkali carbonate-comprising material in step b), preferably the calcium carbonate-comprising material, is added in aqueous form, the at least one earth alkali carbonate-comprising material, preferably the calcium carbonate-comprising material, added in step d) is in form of an aqueous suspension having solids content in the range from 0.01 to 20.0 wt.-%, more preferably in the range from 1.0 to 15.0 wt.-% and most preferably in the range from 2.0 to 10.0 wt.-%, based on the total weight of the suspension. This slurry is preferably generated on site using a high concentrated slurry without using any dispersing agent having e.g. a solid content between 30.0 and 60.0 wt.-%, such as about 40 wt.-% or using the earth alkali carbonate-comprising material, preferably the calcium carbonate-comprising material, in solid form for example, as powder or in form of granules.

For the purpose of the present invention, a "suspension" or "slurry" refers to a system comprising solvent, i.e. an aqueous solvent, and particles of earth alkali carbonate-comprising material and/or earth alkali hydrogen carbonate, wherein at least a part of the particles of the earth alkali carbonate-comprising material and/or earth alkali hydrogen carbonate are present as insoluble solids in the aqueous solvent. Said term does not exclude that a part of the earth alkali carbonate-comprising material and/or earth alkali hydrogen carbonate particles is dissolved in the aqueous solvent.

In addition to the at least one earth alkali carbonate-comprising material, preferably the calcium carbonate-comprising material, the suspension comprising the at least one earth alkali carbonate-comprising material, preferably the calcium carbonate-comprising material, can comprise further micronized minerals. According to one embodiment, the suspension comprising the at least one earth alkali carbonate-comprising material, preferably the calcium carbonate-comprising material, can comprise micronized calcium magnesium carbonate, e.g. dolomitic limestone, calcareous dolomite or half burnt dolomite, magnesium oxide such as burnt dolomite, magnesium sulphate, potassium hydrogen carbonate, sodium hydrogen carbonate and/or other minerals containing essential trace elements.

For example, the at least one earth alkali carbonate-comprising material in step b), preferably the calcium carbonate-comprising material, is provided in a storage tank (13), which is connected to a vessel (14) suitable for the preparation of a suspension comprising the at least one earth alkali carbonate-comprising material, preferably the calcium carbonate-comprising material. Preferably, vessel (14) is connected with the side stream (15) or, if the side stream comprises a side branch, vessel (14) is preferably connected with the side branch of the side stream (15b) such that the water provided in the side stream (15) or the side branch of the side stream (15b) is used for the preparation of the suspension comprising the at least one earth alkali carbonate-comprising material, preferably the calcium carbonate-comprising material. The suspension comprising the at least one earth alkali carbonate-comprising material, preferably the calcium carbonate-comprising material, (16) is then preferably transferred to a container, preferably reactor tank (1), for carrying out process step c). If the side stream (15) comprises a side branch, the suspension comprising the at least one earth alkali carbonate-comprising material, preferably the calcium carbonate-comprising material, prepared in the side branch of the side stream (15b) can be also directed into the main branch of the side stream (15a) first and the diluted suspension comprising the at least one earth alkali carbonate-comprising material, preferably the calcium carbonate-comprising material, obtained in the main branch of the side stream (15a) is then transferred to the container, preferably reactor tank (1), for carrying out process step c). Thus, the storage tank (13) and the vessel (14) may be part of the side stream (15).

In one embodiment, the earth alkali carbonate-comprising material may be combined with the water in a container, preferably in a reactor tank (1). That is to say, the at least one earth alkali carbonate-comprising material in step b), preferably the calcium carbonate-comprising material, may be provided in a storage tank (13), which is directly connected to a container, preferably to reactor tank (1).

The at least one earth alkali carbonate-comprising material, e.g. the calcium carbonate-comprising material, is preferably dosed via a dosing unit (25) into a stream of water or directly into a tank. The dosing unit (25) may be any kind of dosing unit known to the skilled person and typically used for dosing earth alkali carbonate-comprising materials.

In an alternative embodiment, the at least one earth alkali carbonate-comprising material in step b), preferably the calcium carbonate-comprising material, is provided in a storage tank (13), which is directly connected to the side stream (15) or, if the side stream comprises a side branch, the storage tank (13) is directly connected to the side branch of the side stream (15b) such that the water provided in the side stream (15) or the side branch of the side stream (15b) is used for the preparation of the suspension comprising the at least one earth alkali carbonate-comprising material, preferably the calcium carbonate-comprising material. In this embodiment, the at least one earth alkali carbonate-comprising material in step b), preferably the calcium carbonate-comprising material, is thus directly dosed into the side stream (15) or the side branch of the side stream (15b), e.g. before the suspension comprising the at least one earth alkali carbonate-comprising material, preferably the calcium carbonate-comprising material, (16) is transferred to a container, preferably a reactor tank (1) for carrying out process step c). Alternatively, if the side stream (15) comprises a side branch, the suspension comprising the at least one earth alkali carbonate-comprising material, preferably the calcium carbonate-comprising material, prepared in the side branch of the side stream (15b) can be also directed into the main branch of the side stream (15a) first and the diluted suspension comprising the at least one earth alkali carbonate-comprising material, preferably the calcium carbonate-comprising material, obtained in the main branch of the side stream (15a) is then transferred to the container, preferably reactor tank (1), for carrying out process step c).

If the process consists of the main process flow (17), i.e. does not comprise at least one side stream (15), the at least one earth alkali carbonate-comprising material in step b), preferably the calcium carbonate-comprising material, is provided in a storage tank (13), which is preferably connected to a vessel (14) suitable for the preparation of a suspension comprising the at least one earth alkali carbonate-comprising material, preferably the calcium carbonate-comprising material. Preferably, vessel (14) is connected with the main process flow (17) such that the water provided in the main process flow (17) is used for the preparation of the suspension comprising the at least one earth alkali carbonate-comprising material, preferably the calcium carbonate-comprising material. The suspension comprising the at least one earth alkali carbonate-comprising material, preferably the calcium carbonate-comprising material, (16) is then preferably transferred to a container, preferably a reactor tank (1) for carrying out process step c).

In one embodiment, the earth alkali carbonate-comprising material may be combined with the water of the main process flow (17) in a container, preferably in a reactor tank (1). That is to say, the at least one earth alkali carbonate-comprising material in step b), preferably the calcium carbonate-comprising material, may be provided in a storage tank (13), which is directly connected to a container, preferably to reactor tank (1).

In an alternative embodiment, the at least one earth alkali carbonate-comprising material in step b), preferably the calcium carbonate-comprising material, is provided in a storage tank (13), which is directly connected to the main process flow (17) such that the water provided in the main process flow (17) is used for the preparation of the suspension comprising the at least one earth alkali carbonate-comprising material, preferably the calcium carbonate-comprising material. In this embodiment, the at least one earth alkali carbonate-comprising material in step b), preferably the calcium carbonate-comprising material, is thus directly dosed into the main process flow (17), e.g. before the suspension comprising the at least one earth alkali carbonate-comprising material, preferably the calcium carbonate-comprising material, (16) is transferred to a container, preferably a reactor tank (1) for carrying out process step c).

If the main process flow (17) comprises one or more side branches, the calcium carbonate-comprising material, can be directly dosed into the side branch of the main process flow (17b) or vessel (14) can be connected with the side branch of the main process flow (17b).

Step c): Provision of $CO_2$ or an Acid

According to step c) of the inventive process, $CO_2$ or an acid having a $pK_a$-value <5 is provided.

Preferably, the $pK_a$-value <5 is determined at 25° C.

The carbon dioxide used is selected from among gaseous carbon dioxide, liquid carbon dioxide, solid carbon dioxide and a gaseous mixture of carbon dioxide and other gases such as carbon dioxide containing flue gases exhausted from industrial processes like combustion processes or calcination processes or alike. Preferably, the carbon dioxide is gaseous carbon dioxide. When a gaseous mixture of carbon dioxide and other gases is used, then the carbon dioxide is present in the range of 90.0 to about 99.0% by volume, and preferably in the range of 95.0 to 99.0% by volume, based on the total volume of the gaseous mixture. For example, the carbon dioxide is present in an amount of at least 97.0% by volume, based on the total volume of the gaseous mixture.

The acid used in the inventive process is preferably an acid having a $pK_a$-value <4 at 25° C. For example, the acid of step c) is selected from the group consisting of sulphuric acid, hydrochloric acid, nitric acid or citric acid and mixtures thereof. In one embodiment, the acid will be chosen among the acids with a $pK_a$-value lower than or equal to zero at 25° C. and more particularly chosen from sulphuric acid, hydrochloric acid or mixtures thereof. Alternatively, the acid can be a salt having an acidic pH, such as alkali metal hydrogen salts, e.g. NaHSO$_4$ and/or KHSO$_4$.

Preferably, CO$_2$ is provided in step c).

In one embodiment, the CO$_2$ or acid having a pK$_a$-value <5 is dosed into the container (1). Preferably, container (1) is connected to a recirculating air stream (5). For example, the recirculating air stream (5) is arranged such that the air stream is recirculated from the bottom to top direction of container (1). In one embodiment, the CO$_2$ or acid having a pK$_a$-value <5 of step c) is injected into the recirculating air stream (5). That is to say, the CO$_2$ or acid having a pK$_a$-value <5 of step c) is added to the air or process fluid of the recirculating air stream (5).

Step d): Combining the Water with the at Least One Earth Alkali Carbonate-Comprising Material and the CO$_2$ or Acid According to step d) of the inventive process, the water of step a) is combined with the at least one earth alkali carbonate-comprising material of step b) and the CO$_2$ or acid of step c) in any order.

The combining of the water of step a) with the at least one earth alkali carbonate-comprising material of step b) and the CO$_2$ or acid of step c) according to process step d) can be accomplished by any conventional means known to the skilled person. Preferably, the combining may be carried out under mixing and/or homogenizing conditions. The skilled person will adapt these mixing and/or homogenizing conditions such as the mixing speed and temperature according to his process equipment.

For example, the combining may be carried out in a container, preferably a reactor tank (1). Such tanks are well known to the skilled person and are available from a wide range of suppliers.

In particular, the water of step a) is combined with the at least one earth alkali carbonate-comprising material of step b) and the CO$_2$ or acid of step c) in any order such as to obtain an aqueous suspension S1 comprising at least one earth alkali hydrogen carbonate.

It is appreciated that the at least one earth alkali carbonate-comprising material of step b) can be added to the water provided in the main process flow (17) or a side branch of the main process flow (17b) if the process consists of the main process flow (17). Alternatively, the at least one earth alkali carbonate-comprising material of step b) is added to the water provided in the side stream (15) or a side branch of the side stream (15b). Thus if the process comprises a side stream (15), the at least one earth alkali carbonate-comprising material of step b) is preferably added to the water provided in the side stream (15). If the side stream (15) comprises a side branch, the at least one earth alkali carbonate-comprising material of step b) is preferably added to the water provided in the side branch of the side stream (15b). If the main process flow (17) comprises a side branch, the at least one earth alkali carbonate-comprising material of step b) is preferably added to the water provided in the side branch of the main process flow (17b).

Preferably, the at least one earth alkali carbonate-comprising material of step b) is added to the water provided in the side stream (15) or the side branch of the side stream (15b), if the side stream comprises side branches, or the main process flow (17) or the side branch of the main process flow (17b), if the process does not comprise a side stream (15), such that an aqueous suspension comprising the at least one earth alkali carbonate-comprising material is obtained.

The aqueous suspension comprising the at least one earth alkali carbonate-comprising material obtained in the side stream (15) or the side branch of the side stream (15b), if the side stream comprises side branches, or the main process flow (17) or the side branch of the main process flow (17b), if the process does not comprise a side stream (15), preferably has a solids content in the range from 0.01 to 20.0 wt.-%, more preferably in the range from 1.0 to 15.0 wt.-% and most preferably in the range from 2.0 to 10.0 wt.-%, based on the total weight of the suspension.

The carbon dioxide or acid having a pK$_a$-value <5 (at 25° C.) can be injected into the aqueous suspension comprising the at least one earth alkali carbonate-comprising material obtained in the side stream (15) or the side branch of the side stream (15b), if the side stream comprises side branches, or the main process flow (17) or the side branch of the main process flow (17b), if the process does not comprise a side stream (15), at a controlled rate, forming a dispersion of carbon dioxide bubbles in the stream and allowing the bubbles to dissolve therein. For example, the carbon dioxide or acid having a pK$_a$-value <5 (at 25° C.) is injected into the water such that the concentration of carbon dioxide in the water is from 10 to 1 500 mg/l and preferably 50 to 500 mg/l according to the starting CO$_2$ concentration, in order to reach a final target pH value (excess CO$_2$) and final target calcium concentration (added CaCO$_3$).

According to one embodiment of the present process, process step d) thus comprises the steps of:

ii1) combining the water of step a) with the at least one earth alkali carbonate-comprising material of step b), and ii2) combining the mixture of ii1) with the CO$_2$ or acid of step c).

In this embodiment, the aqueous suspension comprising the at least one earth alkali carbonate-comprising material obtained in the side stream (15) or the side branch of the side stream (15b), if the side stream comprises side branches, or the main process flow (17) or the side branch of the main process flow (17b), if the process does not comprise a side stream (15), is preferably transferred (16) to a container, more preferably to a reactor tank (1), into which the carbon dioxide or acid having a pK$_a$-value <5 (at 25° C.) is injected. More preferably, the CO$_2$ or acid having a pK$_a$-value <5 of step c) is injected into container (1) via recirculating air stream (5). Thus, the CO$_2$ or acid having a pK$_a$-value <5 of step c) is preferably added to the air or process fluid of the recirculating air stream (5).

Alternatively, the carbon dioxide or acid having a pK$_a$-value <5 (at 25° C.) is added to the water provided in the side stream (15) or the side branch of the side stream (15b), if the side stream comprises side branches, or the main process flow (17) or the side branch of the main process flow (17b), if the process does not comprise a side stream (15), such that a pH-value in the range from 2.5 to 7.5 is adjusted. Preferably, the pH-value is adjusted to the range from 3.0 to 7.0 and preferably to the range from 4.0 to 5.0.

Adding carbon dioxide or an acid having a pK$_a$-value <5 (at 25° C.) to the water provided in the side stream (15) or the side branch of the side stream (15b), if the side stream comprises side branches, or the main process flow (17) or the side branch of the main process flow (17b), if the process does not comprise a side stream (15), thus results in acidified water.

The carbon dioxide or acid having a pK$_a$-value <5 (at 25° C.) can be injected into the water provided in the side stream (15) or the side branch of the side stream (15b), if the side stream comprises side branches, or the main process flow (17) or the side branch of the main process flow (17b), if the process does not comprise a side stream (15), at a controlled rate, forming a dispersion of carbon dioxide bubbles in the stream and allowing the bubbles to dissolve therein. For example, the carbon dioxide or acid having a $pK_a$-value <5 (at 25° C.) is injected into the water such that the concentration of carbon dioxide in the water is from 10 to 1 500 mg/l and preferably 50 to 500 mg/l according to the starting $CO_2$ concentration, in order to reach a final target pH value (excess $CO_2$) and final target calcium concentration (added $CaCO_3$).

The amount of carbon dioxide or acid having a plc-value <5 (at 25° C.) that is injected into the water provided in the side stream (15) or the side branch of the side stream (15b), if the side stream comprises side branches, or the main process flow (17) or the side branch of the main process flow (17b), if the process does not comprise a side stream (15), will depend on the amount of carbon dioxide that is already present in the water provided in the side stream (15) or the side branch of the side stream (15b) or the main process flow (17) or the side branch of the main process flow (17b). The amount of carbon dioxide that is already present in the water, in turn, will depend, e.g., on the treatment up-stream of the water. Water, for example, that has been desalinated by flash evaporation will contain another amount of carbon dioxide, and thus another pH, than water that has been desalinated by reverse osmosis. Water, for example, that has been desalinated by reverse osmosis may have a pH of about 5.3 and an amount of $CO_2$ of about 10 mg/l.

Accordingly, the at least one earth alkali carbonate-comprising material of step b) in dry form or in form of an aqueous suspension is injected into the acidified water.

Thus, in this embodiment, process step d) comprises the steps of i1) combining the water of step a) with the $CO_2$ or acid of step c), and i2) combining the mixture of i1) with the at least one earth alkali carbonate-comprising material of step b).

In this embodiment, the carbon dioxide or acid having a $pK_a$-value <5 (at 25° C.) is thus added to the water provided in a side stream (15) or the side branch of the side stream (15b), if the side stream comprises side branches, or the main process flow (17) or the side branch of the main process flow (17b), if the process does not comprise a side stream (15), and the obtained acidified water is transferred to the container, preferably the reactor tank (1). Additionally, the aqueous suspension comprising the at least one earth alkali carbonate-comprising material obtained in a side stream (15) or the side branch of the side stream (15b), if the side stream comprises side branches, or the main process flow (17) or the side branch of the main process flow (17b), if the process does not comprise a side stream (15), is also transferred (16) to the container, preferably the reactor tank (1), such as to combine the acidified water with the aqueous suspension comprising the at least one earth alkali carbonate-comprising material.

Preferably, process step d) is carried out by ii1) combining the water of step a) with the at least one earth alkali carbonate-comprising material of step b), and ii2) combining the mixture of ii1) with the $CO_2$ or acid of step c).

In one embodiment of the inventive process, step d) is preferably carried out at a temperature ranging from 5 to 55° C., more preferably from 15 to 30° C. to ensure a sufficient combining of the water of step a) with the at least one earth alkali carbonate-comprising material of step b) and the $CO_2$ or acid of step c).

It is appreciated that the dissolution rate of earth alkali carbonate in the liquid phase, i.e. water, of the aqueous suspension comprising the at least one earth alkali carbonate-comprising material to obtain the solution S1 comprising at least one earth alkali hydrogen carbonate depends on the quantity of carbon dioxide or acid having a $pK_a$-value <5 dosed but also on the temperature, pH, pressure, initial earth alkali carbonate concentration in the suspension as well as the dosing rate at which the carbon dioxide or acid having a $pK_a$-value <5 (at 25° C.) is introduced into the aqueous suspension comprising the at least one earth alkali carbonate-comprising material.

It is preferred that the carbon dioxide concentration in the aqueous suspension S1 comprising at least one earth alkali hydrogen carbonate obtained in step d) is in the range from 10 to 1 500 mg/l, more preferably from 20 to 1 000 mg/l and most preferably from 50 to 400 mg/l.

Additionally or alternatively, the amount of $CO_2$ used, in mol, to produce 1 mol of the at least one earth alkali hydrogen carbonate in the aqueous suspension S1 obtained in step d) is in the range of 1.0 to 6.0 mol, preferably in the range of 1.0 to 3.0 mol, and most preferably in the range of 1.0 to 2.0 mol.

It is to be noted that the kind of the at least one earth alkali hydrogen carbonate in the aqueous suspension obtained in step d) depends on the at least one earth alkali carbonate-comprising material provided in step b) of the inventive process. Thus, if the at least one earth alkali carbonate-comprising material comprises a calcium carbonate-comprising material, the at least one earth alkali hydrogen carbonate in the aqueous suspension S1 obtained in step d) comprises calcium hydrogen carbonate. Alternatively, if the at least one earth alkali carbonate-comprising material consists of calcium carbonate, the at least one earth alkali hydrogen carbonate in the aqueous suspension S1 obtained in step d) consists of calcium hydrogen carbonate.

It is appreciated that the aqueous suspension S1 comprising at least one earth alkali hydrogen carbonate obtained in step d) preferably has an earth alkali metal concentration as earth alkali hydrogen carbonate in the range from 20 to 1 000 mg/l, preferably in the range from 50 to 600 mg/l and most preferably from 80 to 400 mg/l. In one embodiment of the inventive process, the aqueous suspension S1 comprising at least one earth alkali hydrogen carbonate obtained in step d) being calcium hydrogen carbonate has a calcium metal concentration as calcium hydrogen carbonate in the range from 20 to 1 000 mg/l, preferably in the range from 50 to 600 mg/l and most preferably from 80 to 400 mg/l.

As mentioned above, an aqueous suspension S1 comprising at least one earth alkali hydrogen carbonate is obtained in step d).

The aqueous suspension S1 comprising at least one earth alkali hydrogen carbonate obtained in step d) further comprises undissolved solid particles of the at least one earth alkali carbonate-comprising material, and thus the aqueous suspension S1 comprising at least one earth alkali hydrogen carbonate is subjected to a filtering step e).

In view of this, the aqueous suspension S1 comprising at least one earth alkali hydrogen carbonate obtained in step d) preferably has a turbidity value of more than 10 NTU, more preferably the aqueous suspension S1 comprises visible solids, i.e. is opaque.

"Turbidity" in the meaning of the present invention describes the cloudiness or haziness of a fluid caused by individual particles (suspended solids) that are generally invisible to the naked eye. The measurement of turbidity is a key test of water quality and can be carried out with a nephelometer. The units of turbidity from a calibrated nephelometer as used in the present invention are specified as Nephelometric Turbidity Units (NTU).

In one embodiment of the present invention, the aqueous suspension S1 comprising at least one earth alkali hydrogen carbonate obtained in step d) preferably has solids content in the range from 0.01 to 10.0 wt.-%, more preferably in the range from 0.5 to 10.0 wt.-% and most preferably in the range from 1.2 to 8.0 wt.-%, based on the total weight of the aqueous suspension S1.

Step e): Filtering at Least a Part of the Aqueous Suspension S1

According to step e) of the inventive process, at least a part of the aqueous suspension S1 obtained in step d) is filtered by passing the aqueous suspension S1 through at least one submerged membrane module in order to obtain an aqueous solution S2 comprising at least one earth alkali hydrogen carbonate.

Filtering step e) is preferably carried out in a container, preferably a reactor tank (1).

In one embodiment of the inventive process, step e) is preferably carried out at a temperature ranging from 5 to 55° C., more preferably from 15 to 45° C. to ensure a sufficient combining of the water of step a) with the at least one earth alkali carbonate-comprising material of step b) and the $CO_2$ or acid of step c).

It is appreciated that process steps d) and e) may be carried out separately or simultaneously, i.e. in different containers or the same container. Thus, process steps d) and e) can be carried out in one or more containers.

For example, if process steps d) and e) are carried out in different containers, i.e. separately, process steps d) and e) are carried out in two or more containers, preferably two containers. In this embodiment, it is appreciated that process step e) is carried out after process step d).

Alternatively, process steps d) and e) are carried out in the same container. In this embodiment, it is appreciated that process steps d) and e) are carried out simultaneously.

In view of the decreased overall consumption of energy and higher cost efficiency, it is preferred that process steps d) and e) are carried out in the same container, i.e. simultaneously, preferably in a reactor tank (1).

If process steps d) and e) are carried out simultaneously, steps d) and e) are preferably carried out at a temperature ranging from 5 to 55° C., more preferably from 15 to 45° C.

It is one specific requirement of the inventive process that at least a part of the aqueous suspension S1 is filtered through at least one submerged membrane module (2). Preferably, the total quantity of the aqueous suspension S1 is filtered through at least one submerged membrane module (2).

The at least one submerged membrane module (2) is thus located in a container, preferably in a reactor tank (1).

The at least one submerged membrane module may be any kind of submerged membrane module known to the skilled person and typically used for filtering sludges and aqueous suspensions comprising minerals, pigments and/or fillers. For example, a submerged membrane module of Toray Industries, Inc. may be used.

The at least one submerged membrane module (2), i.e. the membrane, preferably has a pore size of <1 μm, and more preferably <0.1 μm, e.g. from 0.04 to 0.9 μm such as about 0.04 μm or 0.08 μm. The membrane of the at least one submerged membrane module (2) may be of ceramic, polymer, or other synthetic material. For example, the at least one submerged membrane module (2) comprises a membrane which is made of a material selected from the group comprising a sintered material, porous porcelain, synthetic polymers, like polyethylene, polypropylene, polyethylene sulfone, polyvinylidene fluoride (PVDF) or Teflon®, and mixtures thereof. In one embodiment, the at least one submerged membrane module (2) further comprises fibres or a non-woven fabric, such as fibres or a non-woven fabric made of a material selected from the group comprising synthetic polymers, like polyethylene, polypropylene, polyester or, and mixtures thereof.

It is appreciated that the number of the at least one submerged membrane module (2) depends on the size of the process. The person skilled in the art may adapt this number of submerged membrane modules on the specific process size used.

The at least one submerged membrane module (2) preferably has a high flux, i.e. a high flow rate per unit membrane area and time (flux=l/[m²*h]). For example, the at least one submerged membrane module (2) has a flux of ≥10 l/(m² h), preferably in the range from 20 to 100 l/(m² h), and most preferably in the range from 40 to 100 l/(m² h).

It is preferred that the at least one submerged membrane module (2) is arranged such that air or process fluid is recirculated (5) across at least a part of the surface of the at least one submerged membrane module. This has the advantage that $CO_2$ can be efficiently introduced into the container, preferably the reactor tank (1), for improving the efficiency of formation of the aqueous suspension S1 comprising at least one earth alkali hydrogen carbonate. Furthermore, this arrangement may result in a cleaning of the at least one submerged membrane module (2) by cross flow aeration which may reduce the fouling of the at least one submerged membrane module (2). Furthermore, this arrangement has the benefit of maintaining a homogenous suspension and preventing the settling of undissolved particles.

In one embodiment, air or process fluid is recirculated (5) across at least a part of the surface of the at least one submerged membrane module (2) from the bottom to top direction of the at least one submerged membrane module (2) and/or the container, preferably the reactor tank (1), preferably the at least one submerged membrane module (2) and the container, preferably the reactor tank (1).

It is appreciated that the $CO_2$ or acid of step c) (4) is preferably added to the air or process fluid which is recirculated (5) across at least a part of the surface of the at least one submerged membrane module (2).

If air or process fluid is recirculated across at least a part of the surface of the at least one submerged membrane module, it is preferred that the container, preferably the reactor tank (1), is sealed and the air at the top of the container, preferably the reactor tank (1), is used as the feed and reintroduced (5) at the bottom of the container, preferably the reactor tank (1).

Thus, process steps d) and e) are preferably carried out in the same container, preferably the reactor tank (1), and air or process fluid is recirculated (5) across at least a part of the surface of the at least one submerged membrane module (2) from the bottom to top direction of the at least one submerged membrane module (2) and the container, preferably the reactor tank (1). More preferably, process steps d) and e) are carried out in the same container, preferably the reactor tank (1), and the $CO_2$ or acid of step c) (4) is added to the air or process fluid which is recirculated (5) across at least a part of the surface of the at least one submerged membrane module (2) and container, preferably the reactor tank (1).

It is appreciated that the recirculating air stream (5) is preferably independent from the side stream (15) or the main process flow (17), if the process does not comprise a side stream (15), i.e. the inlet and outlet of the recirculating air stream (5) are connected to the container, preferably the reactor tank (1), in positions differing from the inlet and outlet of the side stream (15) or the main branch of the side stream (15a) or the side branch of the side stream (15b) or the main process flow (17) or the main branch of the main process flow (17a) or the side branch of the main process flow (17b).

In addition to the cleaning described above, the process may comprise a step of cleaning the at least one submerged membrane module (2).

For example, the inventive process comprises a further step f) of backwashing the at least one submerged membrane module.

The term "backwashing" in the meaning of the present invention refers to the addition of water and/or chemicals from the other side of the at least one submerged membrane module (2), i.e. from the permeate side to the feed side of the at least one submerged membrane module and/or container, for cleaning the at least one submerged membrane module (2).

For example, the backwashing of the at least one submerged membrane module (2) may be carried out with water. If the inventive process comprises a further step f) of backwashing the at least one submerged membrane (2) with water, the backwashing may be done every 5 to 60 min, e.g. every 10 to 15 min.

Additionally, $CO_2$ or an acid having a $pK_a$-value <5 (at 25° C.) can be added to the water. In this embodiment, the backwashing may be done once or twice a week.

It is appreciated that the present process can be carried out in form of a batch process, a semi-continuous or a continuous process.

The wording "semi-continuous process" in the meaning of the present application refers to at least one process step which is carried out in continuous form.

The aqueous solution S2 comprising at least one earth alkali hydrogen carbonate obtained by the inventive process preferably has a carbon dioxide concentration in the range from 0.001 to 300 mg/l, more preferably in the range from 0.1 to 150 mg/l, most preferably in the range of 0.5 to 50.

It is appreciated that the aqueous solution S2 comprising at least one earth alkali hydrogen carbonate obtained in step e) has an earth alkali metal concentration as earth alkali hydrogen carbonate in the range from 20 to 1 000 mg/l. Preferably, the aqueous solution S2 comprising at least one earth alkali hydrogen carbonate obtained in step e) has an earth alkali metal concentration as earth alkali hydrogen carbonate in the range from 50 to 500 mg/l and more preferably from 80 to 300 mg/l.

In one embodiment of the inventive process, the aqueous solution S2 comprising at least one earth alkali hydrogen carbonate obtained in step e) comprises calcium hydrogen carbonate, the solution having a calcium metal concentration as calcium hydrogen carbonate in the range from 20 to 1 000 mg/l, preferably in the range from 50 to 500 mg/l and more preferably from 80 to 300 mg/l.

In an alternative embodiment of the inventive process, the aqueous solution S2 comprising at least one earth alkali hydrogen carbonate obtained in step e) comprises magnesium hydrogen carbonate, the solution having a magnesium metal concentration as magnesium hydrogen carbonate in the range from 20 to 1 000 mg/l, preferably in the range from 50 to 400 mg/l and more preferably from 80 to 300 mg/l.

Alternatively, the aqueous solution S2 comprising at least one earth alkali hydrogen carbonate obtained in step e) comprises calcium hydrogen carbonate and magnesium hydrogen carbonate, the solution having a total calcium and magnesium metal concentration as calcium and magnesium hydrogen carbonate in the range from 20 to 1 000 mg/l, preferably in the range from 50 to 500 mg/l and more preferably from 80 to 300 mg/l.

In one embodiment of the present invention, the aqueous solution S2 comprising at least one earth alkali hydrogen carbonate obtained in step e) has a dissolved content of the at least one earth alkali hydrogen carbonate in the range from 0.001 to 2.0 wt.-%, more preferably in the range from 0.001 to 0.05 wt.-% and most preferably in the range from 0.001 to 0.03 wt.-%, based on the total weight of the aqueous solution.

Additionally or alternatively, the aqueous solution S2 comprising at least one earth alkali hydrogen carbonate obtained in step e) has preferably a turbidity value of lower than 0.5 NTU, and more preferably of lower than 0.3 NTU. For example, the aqueous solution S2 comprising at least one earth alkali hydrogen carbonate obtained in step e) has a turbidity value of lower than 0.2 NTU or of lower than 0.1 NTU.

It is appreciated that the aqueous solution S2 comprising at least one earth alkali hydrogen carbonate obtained in step e) preferably has a pH-value in the range from 6.1 to 8.9 and preferably in the range from 6.5 to 8.5.

According to one embodiment of the inventive process, the aqueous solution S2 comprising at least one earth alkali hydrogen carbonate obtained in step e) has a German hardness from 1 to 55° dH, preferably from 3 to 30° dH, and most preferably from 4.5 to 17° dH.

For the purpose of the present invention, the German hardness is expressed in "degree German hardness, ° dH". In this regard, the German hardness refers to the total amount of earth alkali ions in the aqueous solution comprising the earth alkali hydrogen carbonate.

It is preferred that the aqueous solution comprising at least one earth alkali hydrogen carbonate obtained by the inventive process has a German hardness that is at least 3° dH, more preferably at least 5° dH, higher than the German hardness of the water provided in step a).

In one embodiment the aqueous solution S2 comprising at least one earth alkali hydrogen carbonate obtained by the inventive process is suitable as mineralized water. This is preferably the case if the process does not comprise at least one side stream (15) or if the at least one side stream (15) does not comprise side branches. That is to say, the aqueous solution S2 comprising at least one earth alkali hydrogen carbonate obtained by the inventive process is mineralized water if the process consists of the main process flow (17).

Alternatively, the aqueous solution S2 comprising at least one earth alkali hydrogen carbonate obtained by the inventive process is suitable for the mineralization and/or stabilization of water. For example, the aqueous solution S2 comprising at least one earth alkali hydrogen carbonate obtained by the inventive process is suitable for the mineralization and/or stabilization of desalinated or naturally soft water. This is preferably the case, if the process comprises at least one side stream (15) or if the at least one side stream (15) comprises side branches.

For example, the aqueous solution S2 comprising at least one earth alkali hydrogen carbonate obtained in step e) is transferred (9) from the side stream (15) into the main process flow (17) for mineralization and/or stabilization of the water.

The water that can be mineralised by using the aqueous solution S2 comprising at least one earth alkali hydrogen carbonate obtained by the inventive process can be derived from various sources and can be selected from amongst distilled water, industrial water, tap water, desalinated water such as desalinated sea water, brackish water or brine, treated wastewater or naturally soft water such as ground water, surface water or rainfall. Preferably, the water to be mineralised by using the aqueous solution S2 comprising at least one earth alkali hydrogen carbonate obtained by the inventive process is desalinated water, e.g. permeate or distillate obtained from a desalination process.

In view of the good results obtained, the present application further refers in another aspect to a process for the mineralization and/or stabilization of water, the process comprises the steps of i) providing water to be mineralised,
ii) providing an aqueous solution comprising at least one earth alkali hydrogen carbonate obtained by the process, as described herein,
iii) combining the water to be mineralised of step i) and the aqueous solution comprising at least one earth alkali hydrogen carbonate of step ii) in order to obtain mineralised water.

With regard to the definition of the water to be mineralised and/or stabilized, the aqueous solution comprising at least one earth alkali hydrogen carbonate obtained by the process, and preferred embodiments thereof, reference is made to the statements provided above when discussing the technical details of the process for the preparation of an aqueous solution comprising at least one earth alkali hydrogen carbonate of the present invention.

It is preferred that the aqueous solution comprising at least one earth alkali hydrogen carbonate provided in step ii) has a German hardness that is at least 3° dH, more preferably at least 5° dH, higher than the German hardness of the water to be mineralised provided in step i).

In order to neutralize any remaining "aggressive" carbon dioxide and/or to increase the pH to achieve a stable and balanced final water quality, it is preferred to strip the aggressive carbon dioxide, add a base to the mineralised water obtained in step ii1), or a combination of both.

Thus, the process for the mineralization and/or stabilization of water preferably comprises a further step (iv) of pH adjustment, either through stripping the aggressive $CO_2$, adding a base to the mineralised water of step (ii1), a both stripping and adding a base to the mineralised water.

In one embodiment, the base, preferably provided in water, is added to the mineralised water in the main process flow (17) to adjust the pH-value of the mineralised water to a range from 7.0 to 9.0 and to form mineralised water having an earth alkali concentration as earth alkali hydrogen carbonate in the range from 10 to 300 mg/l.

It is thus preferred that the base e.g. $Ca(OH)_2$ (21) is added to the main process flow (17).

The base is preferably an alkali hydroxide and/or earth alkali hydroxide. More preferably, the base is an alkali hydroxide and/or earth alkali hydroxide selected from calcium hydroxide and/or magnesium hydroxide and/or sodium hydroxide, e.g. calcium hydroxide or magnesium hydroxide or sodium hydroxide. The base being an earth alkali hydroxide preferably consists of calcium hydroxide.

According to one embodiment of the inventive process, the base being an alkali hydroxide and/or earth alkali hydroxide is preferably micronized alkali hydroxide and/or earth alkali hydroxide.

For example, the base being an earth alkali hydroxide has a weight median particle size $d_{50}$ from 0.1 to 100.0 µm, preferably from 0.2 to 50.0 µm, more preferably from 0.3 to 25.0 µm, and most preferably from 0.5 to 10.0 µm.

In one embodiment of the present invention, the base being an earth alkali hydroxide has a BET specific surface area of from 0.01 to 200.0 m²/g, and preferably of from 1.0 to 100.0 m²/g, measured by nitrogen gas adsorption using the BET isotherm (ISO 9277:2010).

The base being an alkali hydroxide and/or earth alkali hydroxide is preferably added such that the concentration of the alkali hydroxide and/or earth alkali hydroxide added to the mineralised water is in the range from 0.1 to 100 mg/l and preferably in the range from 0.5 to 10 mg/l.

The base is preferably provided in water. Thus, it is appreciated that the base is preferably in form of a solution or suspension.

If the base being an alkali hydroxide and/or earth alkali hydroxide is in form of a solution or suspension, the alkali hydroxide and/or earth alkali hydroxide content is preferably from 0.5 wt.-% to 50 wt.-%, preferably about 20 wt.-%, based on the total weight of the solution or suspension.

The alkali hydroxide and/or earth alkali hydroxide solution or suspension may be generated on site or independently from the inventive process. If the alkali hydroxide and/or earth alkali hydroxide solution or suspension is prepared independently from the inventive process, the alkali hydroxide and/or earth alkali hydroxide solution or suspension is preferably not prepared from the water provided in step a). Alternatively, the alkali hydroxide and/or earth alkali hydroxide solution or suspension is prepared with the water provided in process step a).

By adding the base, preferably an alkali hydroxide and/or earth alkali hydroxide, to the mineralised water in the main process flow (17), the pH-value of the mineralised water is adjusted to a range from 7.0 to 9.0. Preferably, the pH-value of the mineralised water is adjusted to a pH-value in the range from 7.2 to 8.9 and preferably in the range from 7.8 to 8.4. It is appreciated that the pH adjustment depends on the level of remineralization and the targeted final water quality.

In one embodiment, a part of the water provided in step a) forms the main process flow (17) and the remaining part of the water forms the at least one side stream (15). Thus, the at least one side stream (15) is connected to the main process flow (17), preferably in that the at least one side stream (15) is connected to the main process flow (17) by an inlet and outlet.

In one embodiment, the outlet of the at least one side stream (15) is preferably located after the inlet of the at least one side stream (15) at the main process flow (17).

The term "after" in the meaning of the present invention refers to the succeeding position after another unit of the installation.

If the present process further comprises adding a base, e.g. $Ca(OH)_2$, (21) to the main process flow (17), the base is preferably injected into the mineralised water, i.e. after the outlet of the at least one side stream (15). If the alkali hydroxide and/or earth alkali hydroxide solution or suspension is prepared with the water provided in process step a), it is preferred that it is formed in a side stream (21). This side stream is preferably connected to the main process flow (17) by an inlet and outlet.

A further aspect of the present invention refers to the use of an aqueous solution comprising at least one earth alkali hydrogen carbonate obtained by the process as defined herein, for the mineralization and/or stabilization of water. The water is preferably desalinated or naturally soft water. Alternatively, the present invention refers to the use of an aqueous solution comprising at least one earth alkali hydrogen carbonate obtained by the process as defined herein, as mineralised water. This is preferably the case if the process does not comprise at least one side stream (15). That is to say, the at least one earth alkali carbonate-comprising material of step b) is added to the main process flow (17).

With regard to the definition of the water to be mineralised, the aqueous solution comprising at least one earth alkali hydrogen carbonate obtained by the process and preferred embodiments thereof, reference is made to the statements provided above when discussing the technical details of the process for the preparation of an aqueous solution comprising at least one earth alkali hydrogen carbonate of the present invention.

The following examples may additionally illustrate the invention but are not meant to restrict the invention to the exemplified embodiments.

BRIEF DESCRIPTION OF THE FIGURES

List of Reference Signs (1): reactor tank
(2): submerged membranes (module)
(3): product storage tank
(4): carbon dioxide injection
(5): recirculation air
(6): pressure measurement of recirculation air
(7): pressure measurement in reactor tank
(8): pressure measurement in aqueous solution
(9): aqueous solution S2
(10): flow measurement of aqueous solution
(11): level measurement in reactor tank
(12): turbidity measurement in aqueous solution
(13): calcium carbonate storage silo with dosing screw feeder
(14): vessel for preparing a suspension of calcium carbonate
(15): side stream water supply to process
(16): suspension of micronized calcium carbonate
(17): main process flow
(17a): main branch of the main process flow
(17b): side branch of the main process flow
(18): measurement of pH of blended water stream
(19): measurement of electrical conductivity of blended water stream
(20): storage tank for $Ca(OH)_2$
(21): $Ca(OH)_2$ dosing process stream
(22): pH measurement of final water stream
(23): conductivity measurement of final water stream
(24): final treated water stream
(25): calcium carbonate dosing screw feeder FIG. 1 refers to an installation being suitable for carrying out the general process according to the present invention.

Figure 1:
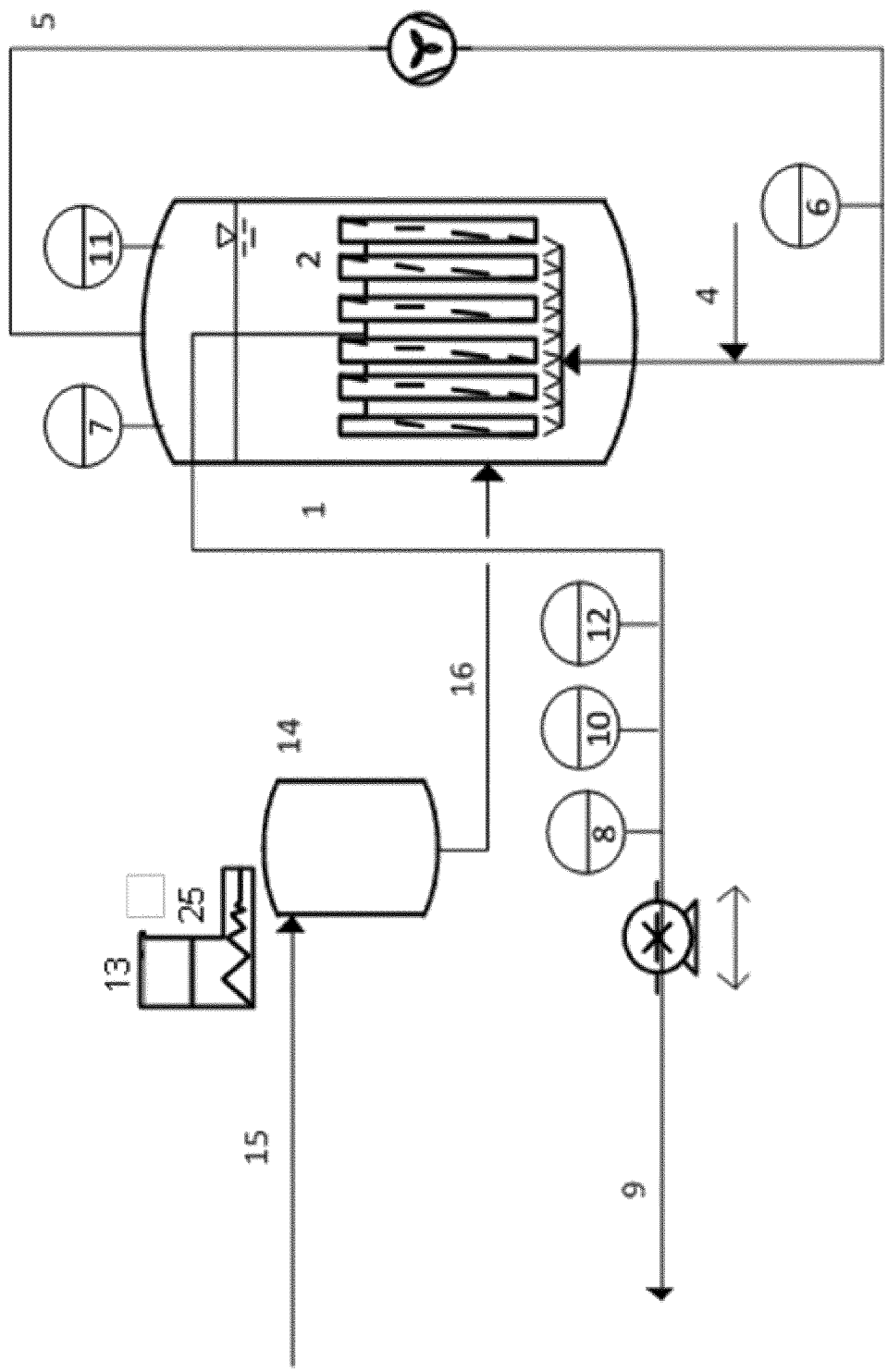

The scope and interest of the invention will be better understood based on the following examples which are intended to illustrate certain embodiments of the invention and are non-limitative.

EXAMPLES

1 Measurement Methods

In the following the measurement methods implemented in the examples are described.

pH of an Aqueous Suspension or Solution

The pH of a suspension or solution was measured using a WTW Multi 3420 pH meter with integrated temperature compensation and a WTWWTW SenTix 940 pH probe. The calibration of the pH electrode was performed using standards of pH values 4.01, 7.00 and 9.21. The reported pH values are the endpoint values detected by the instrument (the endpoint is when the measured signal differs by less than 0.1 mV from the average over the previous 6 seconds).

Solids Content of an Aqueous Suspension

Moisture Analyser

The solids content (also known as "dry weight") was determined using a Moisture Analyser HR73 from the company Mettler-Toledo, Switzerland, with the following settings: temperature of 120° C., automatic switch off 3, standard drying, 5 to 20 g of product.

Particle Size Distribution (Mass % Particles with a Diameter <X) and Weight Median Diameter ($d_{50}$) of a Particulate Material Weight grain diameter and grain diameter mass distribution of a particulate material were determined via the sedimentation method, i.e. an analysis of sedimentation behaviour in a gravitational field. The measurement was made with a Sedigraph™ 5120 or a Sedigraph™ 5100 of Micromeritics Instrument Corporation.

The method and the instrument are known to the skilled person and are commonly used to determine grain size of fillers and pigments. The measurement is carried out in an aqueous solution of 0.1 wt.-% $Na_4P_2O_7$. The samples are dispersed using a high speed stirrer and supersonics.

Turbidity of an Aqueous Suspension of Solution

The turbidity was measured with a Hach Lange 2100AN IS Laboratory Turbidimeter and the calibration was performed using StabCal turbidity standards (formazine standards) of <0.1, 20, 200, 1 000, 4 000 and 7 500 NTU.

Hardness of the Aqueous Solution

The ions involved in water hardness, i.e. $Ca^{2+}$(aq) and $Mg^{2+}$(aq), have been determined by titration with a chelating agent, ethylenediaminetetraacetic acid (EDTA—disodium salt 0.01 M). For buffering pH constant at 10, $NH_3$—$NH_4Cl$ buffer was used. Titration using Eriochrome Black T as indicator determines total hardness due to $Ca^{2+}$ (aq) and $Mg^{2+}$ (aq) ions until the solution turns from wine red to sky blue. The amount of total hardness has been calculated by the following equation:

$$\text{Hardness}=\text{Volume of EDTA (ml)} \times 0.01 \times 100.08 \times 1000/(\text{Volume of sample (ml)})$$

The magnesium hardness was calculated by determining the total concentration of calcium and magnesium ions as well as the concentration of calcium ions. The concentration of calcium ions was determined by first completely precipitating the magnesium ions as $Mg(OH)_2$(s) by adding a 50% w/v NaOH solution, swirling the solution and waiting until complete precipitation. Subsequently, hydroxynaphthol blue was added and the sample was titrated with 0.01 M EDTA until the solution changes to sky blue.

Conductivity

The conductivity was measured at 25° C. using Mettler Toledo Seven

Multi instrumentation equipped with the corresponding Mettler Toledo conductivity expansion unit and a Mettler Toledo InLab® 741 conductivity probe.

The instrument was first calibrated in the relevant conductivity range using commercially available conductivity calibration solutions from Mettler Toledo. The influence of temperature on conductivity is automatically corrected by the linear correction mode. Measured conductivities were reported for the reference temperature of 20° C. The reported conductivity values were the endpoint values detected by the instrument (the endpoint is when the measured conductivity differs by less than 0.4% from the average over the last 6 seconds).

Temperature

The temperature was measured with a handheld WTW probe of Xylem Analytics.

Alkalinity of the Aqueous Solution

The alkalinity of the aqueous solution has been determined by titration of a sample with a 0.1 M solution of hydrochloric acid. The end point of the titration is reached at a constant pH of 4.3. The amount of the alkalinity has been calculated by the following equation:

$$\text{Alkalinity}=\text{Volume of acid (ml)} \times 0.1 \times 100.08 \times 1000/(2 \times \text{Volume of sample (ml)})$$

Acidity of Aqueous Solution

The acidity of the aqueous solution has been determined by titration of the free $CO_2$ with a 0.01 M solution of sodium hydroxide. The end point of the titration is reached at a constant pH of 8.3. The amount of free $CO_2$ has been calculated by the following equation:

$$\text{Free } CO_2 = \text{Volume of NaOH (ml)} \times 0.01 \times 44.01 \times 1000/\text{Volume of sample (ml)}$$

Langelier Saturation Index (LSI)

The Langelier Saturation Index (LSI) describes the tendency of an aqueous liquid to be scale-forming or corrosive, with a positive LSI indicating scale-forming tendencies and a negative LSI indicating a corrosive character. A balanced Langelier Saturation Index, i.e. LSI=0, therefore means that the aqueous liquid is in chemical balance. The LSI is calculated as follows:

$$LSI=pH-pH_s,$$

wherein pH is the actual pH value of the aqueous liquid and $pH_s$ is the pH value of the aqueous liquid at $CaCO_3$ saturation. The $pH_s$ can be estimated as follows:

$$pH_s=(9.3+A+B)-(C+D),$$

wherein A is the numerical value indicator of total dissolved solids (TDS) present in the aqueous liquid, B is the numerical value indicator of temperature of the aqueous liquid in K, C is the numerical value indicator of the calcium concentration of the aqueous liquid in mg/l of $CaCO_3$, and D is the numerical value indicator of alkalinity of the aqueous liquid in mg/l of $CaCO_3$. The parameters A to D are determined using the following equations:

$$A=(\log_{10}(TDS)-1)/10,$$

$$B=-13.12 \times \log_{10}(T+273)+34.55,$$

$$C=\log_{10}[Ca^{2+}]-0.4,$$

$$D=\log_{10}(TAC),$$

wherein TDS are the total dissolved solids in mg/l, T is the temperature in ° C., $[Ca^{2+}]$ is the calcium concentration of the aqueous liquid in mg/l of $CaCO_3$, and TAC is the alkalinity of the aqueous liquid in mg/l of $CaCO_3$.

2 Examples

Inventive Installation—Preparation of an Aqueous Solution of Calcium Bi-Carbonate A general process flow sheet of one installation according to the present invention is shown in FIG. 1. The installation comprises a reactor tank (1) with a submerged membrane (2) of 50 m² inside, a calcium carbonate storage silo (13) with dosing screw feeder and a vessel for preparing a suspension of the calcium carbonate (14).

A calcium hydrogen carbonate solution (9) is produced in permeate stream and this could be used to increase the mineral content and alkalinity of another flow.

The feed water was obtained from reverse osmosis system, producing water of the following water specification:
Sodium: <1 mg/l
Chloride: <2 mg/l
Calcium: 8 mg/l
Magnesium: <1 mg/l
Alkalinity: 12 mg/l (as $CaCO_3$)
° dH: 1.12
pH: 6.9
Conductivity: 24 μS/cm A calcium hydrogen carbonate solution can be produced using the above mentioned equipment in the following manner: Reactor tank (1) is originally filled with a calcium carbonate suspension of 5.0 wt.-% to a defined volume that covers the submerged membrane's surface determined by level measurement in the reactor tank (11). A blower starts recirculating air volume (5) from the top of the reactor tank (1) to diffusers located at the bottom of the submerged membranes (2) to ensure a homogenous suspension is maintained within the reactor tank (1) and to provide some cleaning effect for the submerged membranes (2). The air volume (5) is recirculated at a rate of around 200 times per h. A controlled quantity of carbon dioxide is added at (4) in the air stream. Carbon dioxide loaded recirculation air passes over the submerged membranes (2) from the bottom to the top of the reactor tank (1) creating turbulence, and carbon dioxide passes from the air stream to the calcium carbonate suspension increasing the amount of dissolved carbon dioxide within the suspension. The reaction between the calcium carbonate and the dissolved carbon dioxide allows the formation of an alkaline calcium hydrogen carbonate solution within the reactor tank (1). At the same time, calcium carbonate is added to the vessel (14) from the storage silo (13) for the preparation of a calcium carbonate suspension within the vessel (14). A loss-in-weight screw feeder is used to accurately measure the quantity of calcium carbonate added. Water is also added to the tank and a mixer used to create a homogenous suspension of a known solids content. The suspension (16) of micronized calcium carbonate is then transferred to the reactor tank (1) at a rate equal to the amount of calcium carbonate that is dissolved through reaction with the carbon dioxide, so that the total amount of undissolved calcium carbonate within the reactor tank (1) remains constant. An aqueous solution S2 (9) of filtrated permeate is extracted from the reactor tank (1) through the submerged membranes (2).

Start-Up Pilot Unit

Natural calcium carbonate powder (Millicarb® from Omya International AG, Orgon France, $d_{50}$=3 μm) was used as starting material in a pilot plant according to the inventive installation. Reactor (1) was filled with 900 l of prepared 5 wt.-% calcium carbonate powder suspension, executed by level control (11). Recirculation air stream (5) fan started with 10 m³/h for regeneration of membranes via turbulence. Overpressure of airflow was measured by (6).

Example 1

To produce high loaded concentrate (~250 mg/l alkalinity) 99 g of carbon dioxide (4) was dosed to recirculating air stream within 1 h. Continuous production was started at the end of the first hour recirculation time. During continuous production a suspension of 250 mg/l calcium carbonate (16) was added to the reactor (1) to account for the continuous dissolution of calcium carbonate within the reactor tank (1). At the same time a clear aqueous solution S2 (9) was extracted through the submerged membranes (2) with a concentration of 250 mg/l calcium bi-carbonate (measured as calcium carbonate) using a bi-directional dosing pump. Both ratios—suspension of micronized calcium carbonate (16) and aqueous solution (9)—were controlled by level measurement (11) in reactor tank (1) and flowmeter measurement (10) of the aqueous solution S2 (9). Primary settings of ratios depend from achievable membrane flux rates and were measured as trans-membrane-pressure (8). Quality of aqueous solution S2 (9) was controlled by turbidity measurement (12) and titrations.

The operating conditions and water quality results are given in Table 1 and Table 2 below.

TABLE 1

Process streams of Example 1.

| Process stream | (16) | (9) | (5) |
|---|---|---|---|
| Description | Calcium carbonate suspension | Calcium bi-carbonate solution S2 | Recirculation air |
| Flow rate (l/h) | 1 250 | 1 250 | 20 000 |
| Solids content (wt.-%) | 0.025 | 0 | 0 |
| Concentration (mg/l) | 0 | 220 | 110[a] |

[a]Equivalent dosage of carbon dioxide into reactor based on flow rate of water through reactor.

TABLE 2

Water Quality of Example 1.

| Process stream | (9) |
|---|---|
| Description | Calcium bi-carbonate solution S2 |
| Alkalinity (mg/l as $CaCO_3$) | 220 |
| Hardness (mg/l as $CaCO_3$) | 214 |
| pH | 7.4 |
| Temperature [° C.] | 21.5 |
| Turbidity [NTU] | 0.1 |

In comparison to patent application EP 2 623 467 A1, the above process using the installation according to the present invention has a much better energy efficiency. According to Table 4 of EP 2 623 467 A1, 35 l/h of permeate was produced in 4 different trials from a tubular membrane module (Microdyne-Module MD 063 TP 2N). The suspension in these trials was circulated through the tubular module at a rate of 3 200 l/h with 1.5 bar pressure to produce this permeate stream. The hydraulic energy required to produce this permeate was therefore:

Hydraulic energy$(W) = V \times \rho \times p$ where:
V=flow rate of fluid (m³/s)
ρ=density of fluid (kg/m³)
p=outlet static pressure of pump (kPa)

For the example from patent application EP 2 623 467 A1, with the following inputs:
V=3 200 l/h=8.8e-04 m³/s
ρ=1 000 kg/m³ (for water without any other details)
p=1.5 bar=150 kPa ⇒ $W$=8.888e-04×1 000×150=133 W This produced an average of 54 l/h permeate, and therefore the power consumption per cubic metre of permeate produced can be calculated as:

Power/cubic meter=0.133 kW±0.035 m$^3$/h=3.8 kW·h/m$^3$

Using an installation according to the present invention and as shown in FIG. 1, 1250 l/h=3.47e-04 m$^3$/s of permeate was produced with a pressure of 50 kPa.

The hydraulic energy is therefore calculated as:

Hyrdaulic energy($W$)=$V$×$\rho$×$p$=3.47$e$-04×1000×50=17.4 W

This produced an average of 1 250 l/h permeate, and therefore the power consumption per cubic metre of permeate produced can be calculated as:

Power/cubic meter=0.0174 kW±1.25 m$^3$/h=0.014 kW·h/m$^3$

Therefore the specific power consumption (power per cubic meter of permeate produced) is over 270 times less with the present invention than that of the patent application EP 2 623 467 A1.

The $CO_2$ efficiency according to tests with the inventive installation shown in FIG. 1 and described by EP 2 623 467 A1 is calculated as:

(Free $CO_2$ in water+$CO_2$ dosed)/molecular weight of $CO_2$:(Final Alkalinity–Initial Alkalinity)/molecular weight of $CaCO_3$=(2+110)/44.01 g/mol: (220–12)/100.08 g/mol=2.54:2.08=1.22:1

The $CO_2$ efficiency according to tests performed with an installation according to patent application EP 2 623 467 A1 was shown to be: 110/44.01 g/mol:170/100.08 g/mol=2.5: 1.7=1.47:1

Figure 2:
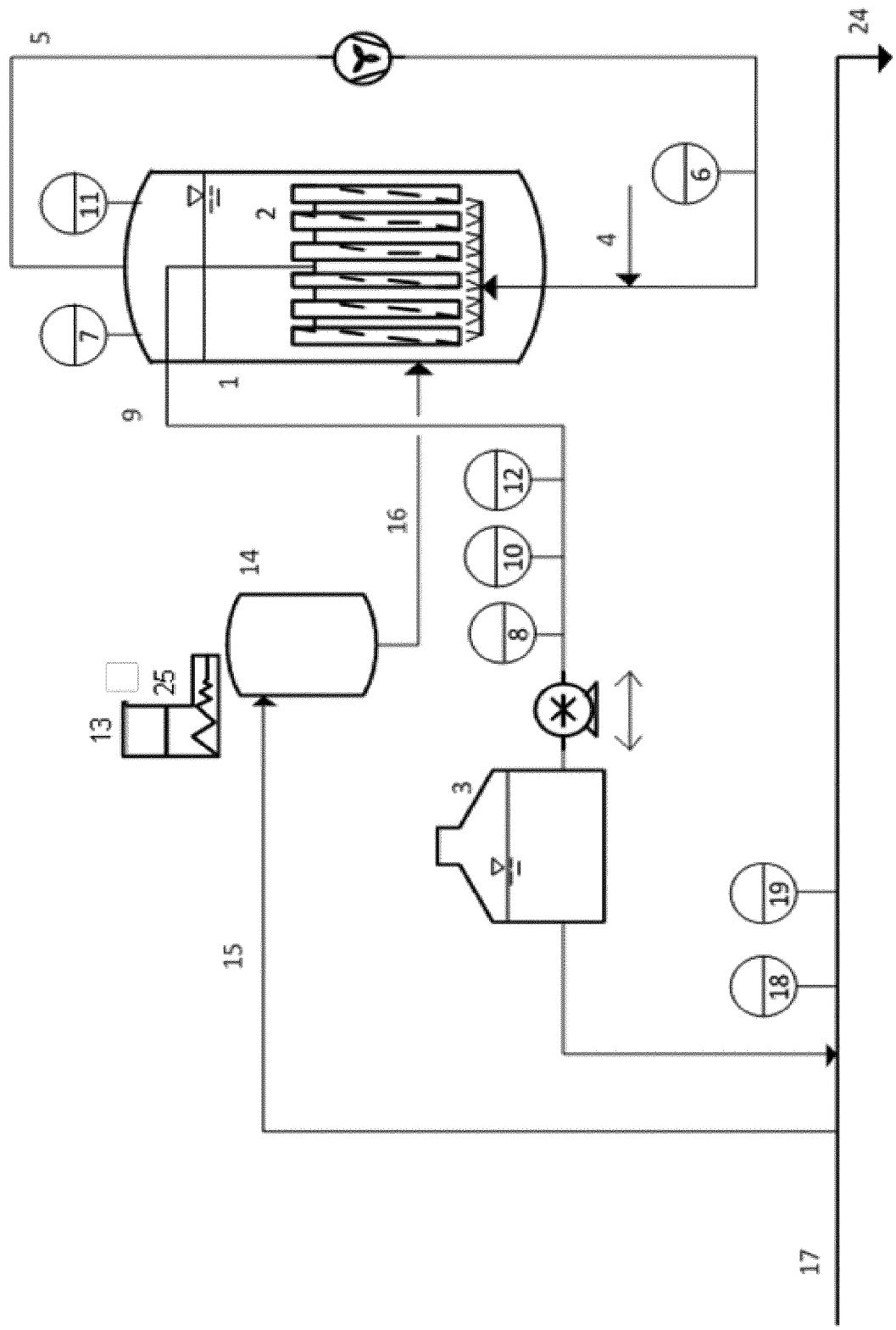
FIG. 2 refers to an installation being suitable for carrying out the mineralization process according to the present invention.

Inventive Installation—Preparation and Dosing of Aqueous Solution of Calcium Bi-Carbonate to Increase the Mineral and Alkalinity Content of a Desalinated Water A general process flow sheet of one installation according to the present invention is shown in FIG. 2. The installation comprises a reactor tank (1) with a submerged membrane (2) of 50 m$^2$ inside, a product storage tank (3), a calcium carbonate storage silo (13) with dosing screw feeder and a vessel for preparing a suspension of the calcium carbonate (14).

A calcium hydrogen carbonate solution is produced in an aqueous solution S2 (9) and dosed into the main process flow (17) to increase the mineral content and alkalinity of the main process flow.

The feed water was obtained from reverse osmosis system, producing water of the following water specification:

Sodium: <1 mg/l
Chloride: <2 mg/l
Calcium: 8 mg/l
Magnesium: <1 mg/l
Alkalinity: 12 mg/l (as $CaCO_3$)
° dH: 1.12
pH: 6.9
Conductivity: 24 µS/cm A calcium hydrogen carbonate solution can be produced in a side stream using the above mentioned equipment in the following manner: Reactor tank (1) is originally filled with a calcium carbonate suspension of 5.0 wt.-% to a defined volume that covers the submerged membrane's (2) surface measured by level measurement (11) in the reactor tank (1). A blower starts recirculating air volume (5) from the top of the reactor tank (1) to diffusers located at the bottom of the submerged membranes (2) to ensure a homogenous suspension is maintained within the reactor (1) and to provide some cleaning effect for the membranes. The air volume (5) is recirculated at a rate of around 200 times per h. A controlled quantity of carbon dioxide is added in the air stream at e.g. position (4). Carbon dioxide loaded recirculation air passes over the submerged membranes (2) from the bottom to the top of the reactor creating turbulence, and carbon dioxide passes from the air stream to the calcium carbonate suspension increasing the amount of dissolved carbon dioxide within the suspension. The reaction between the calcium carbonate and the dissolved carbon dioxide allows the formation of a calcium hydrogen carbonate solution within the reactor tank. At the same time, calcium carbonate is added to the vessel (14) from the storage silo (13) for the preparation of a calcium carbonate suspension within the vessel (14). A loss-in-weight screw feeder is used to accurately measure the quantity of calcium carbonate added. Water is also added to the vessel (14) and a mixer used to create a homogenous suspension of known solids content. The suspension of micronized calcium carbonate (16) is then transferred to the reactor tank (1) at a rate equal to the amount of calcium carbonate that is dissolved through reaction with the carbon dioxide, so that the total amount of undissolved calcium carbonate within the reactor tank (1) remains constant. An aqueous solution S2 (9) of filtrated permeate as clear concentrated calcium hydrogen carbonate solution is used to add the calcium and bicarbonate to the main process flow (17) via a bi-directional dosing pump. A product storage tank (3) was used as a buffer also for backwashing sequence every 10 min.

Start-Up Pilot Unit

Natural calcium carbonate powder (Millicarb® from Omya International, Orgon France, $d_{50}$=3 µm) was used as the starting material in the pilot plant. Reactor tank (1) was filled with 900 l of prepared 5 wt.-% calcium carbonate powder suspension, executed by level measurement (11) in reactor tank (1). Recirculation air stream (5) fan started with 10 m$^3$/h for regeneration of membranes via turbulence. Overpressure of airflow was measured by (6).

Example 2

To produce high loaded concentrate (~250 mg/l alkalinity) 99 g of carbon dioxide (4) was dosed to the recirculating air stream within 1 h. Continuous production was started at the end of the first hour recirculation time. During continuous production a suspension of 250 mg/l calcium carbonate (16) was added to reactor (1) to account for the continuous dissolution of calcium carbonate within the reactor tank (1). At the same time a clear aqueous solution S2 (9) was extracted through the submerged membranes with a concentration of 250 mg/l calcium bi-carbonate (measured as calcium carbonate) and discharged via bi-directional dosing pump through the product storage tank (3) in main stream (17). Both ratios—suspension of micronized calcium carbonate (16) and aqueous solution S2 (9)—were controlled by level measurement (11) in reactor tank (1) and flow measurement (10). Primary settings of ratios depend from achievable membrane flux rates and were measured as trans-membrane-pressure (8). Quality of aqueous solution S2 (9) was controlled by turbidity measurement (12) in the aqueous solution (9) and titrations. Quality of first blend was measured via pH (18), electrical conductivity (19) and titrations of the blended water stream.

The operating conditions and quality results are given in Table 3 and Table 4 below.

TABLE 3

Process streams of Example 2.

| Process stream | (15) | (16) | (9) | (5) | (17) |
|---|---|---|---|---|---|
| Description | Raw water side stream | Calcium carbonate suspension | Calcium bi-carbonate solution S2 | Recirculation air | Main process flow |
| Flow rate (l/h) | 1 250 | 1 250 | 1 250 | 20 000 | 3 750 |
| Solids content (wt.-%) | 0 | 0.025 | 0 | 0 | 0 |
| Concentration (mg/l) | 0 | 0 | 220 | 110$^a$ | 20 |

$^a$Equivalent dosage of carbon dioxide into reactor based on flow rate of water through reactor.

TABLE 4

Water Quality Results of Example 2.

| Process stream | (9) | (24) |
|---|---|---|
| Description: | Calcium bi-carbonate solution S2 | Final water |
| Alkalinity (mg/l as CaCO$_3$) | 220 | 81 |
| Hardness (mg/l as CaCO$_3$) | 214 | 85 |
| pH | 7.4 | 7.25 |
| Temperature [° C.] | 21.5 | 21 |
| Turbidity [NTU] | 0.1 | 0 |

Figure 3:
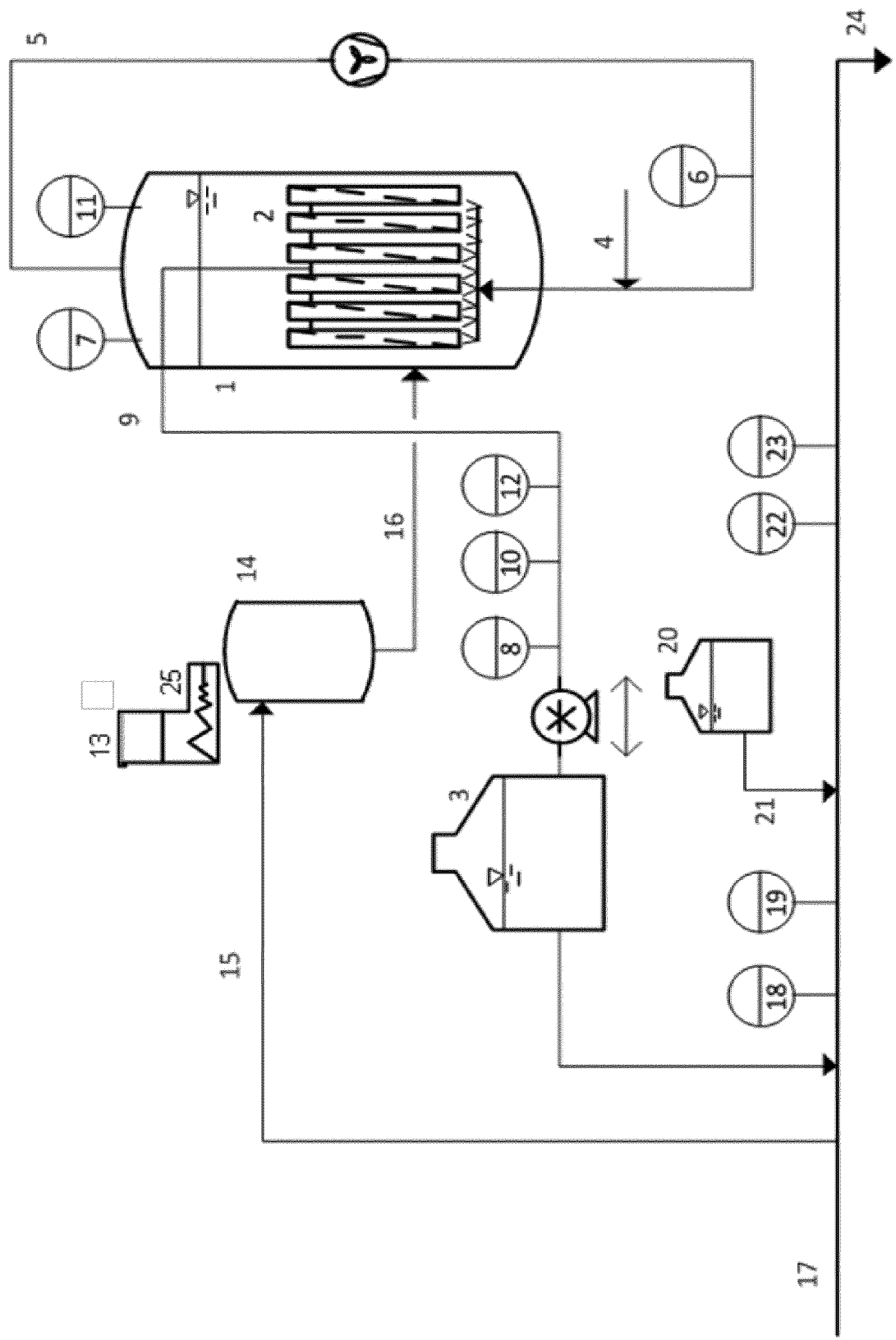
FIG. 3 refers to an installation being suitable for carrying out the mineralization with pH adjustment process according to the present invention.
Figure 4:
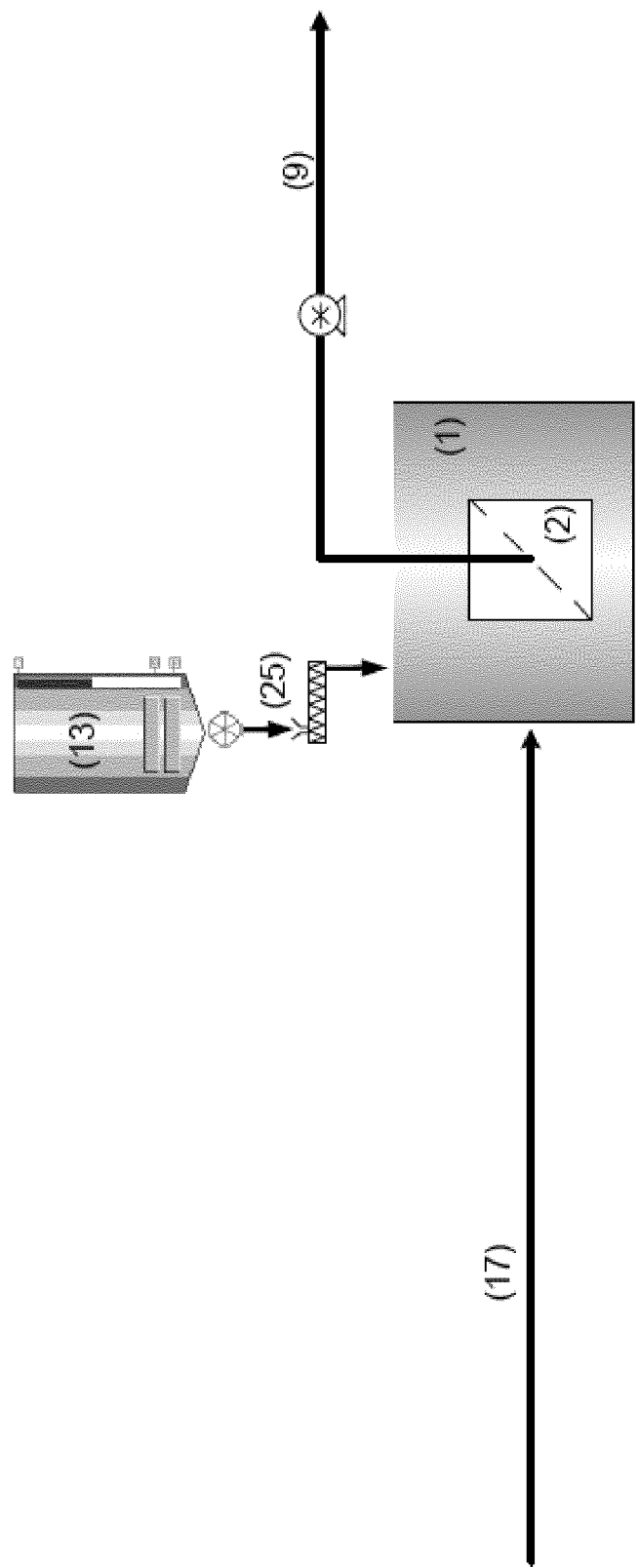
FIG. 4 refers to a schematic illustration of a process comprising a main process flow (17) only and wherein the calcium carbonate is dosed into the container (1) comprising the submerged membrane module (2).
Figure 5:
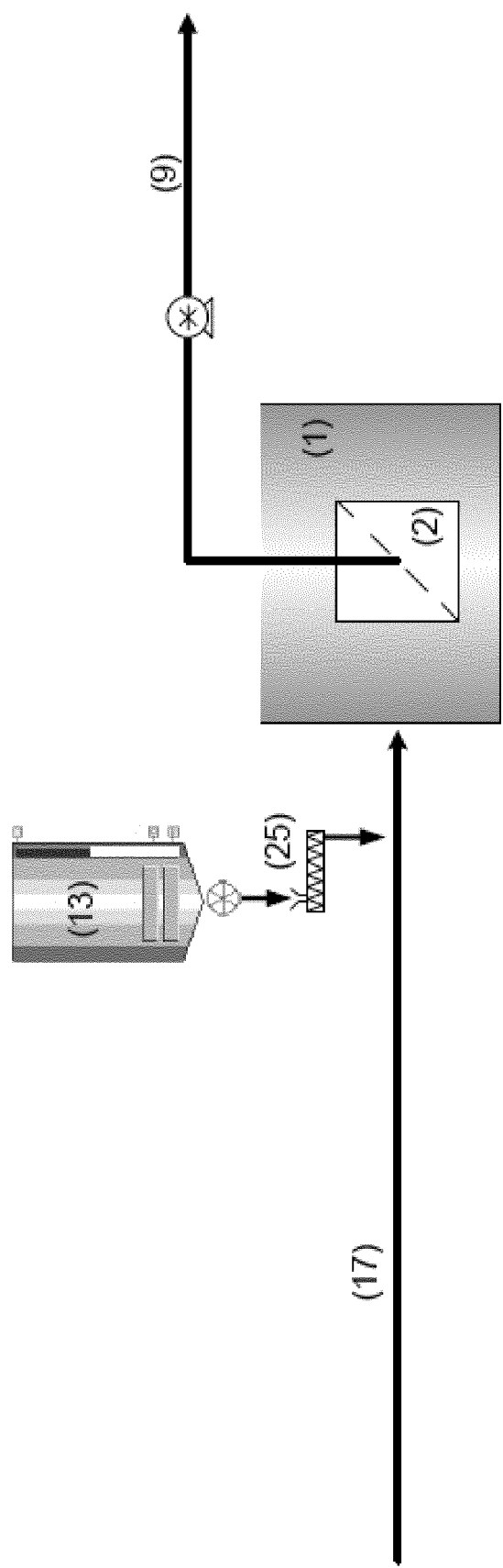
FIG. 5 refers to a schematic illustration of a process comprising a main process flow (17) only and wherein the calcium carbonate is dosed directly into the main process flow (17).
Figure 6:
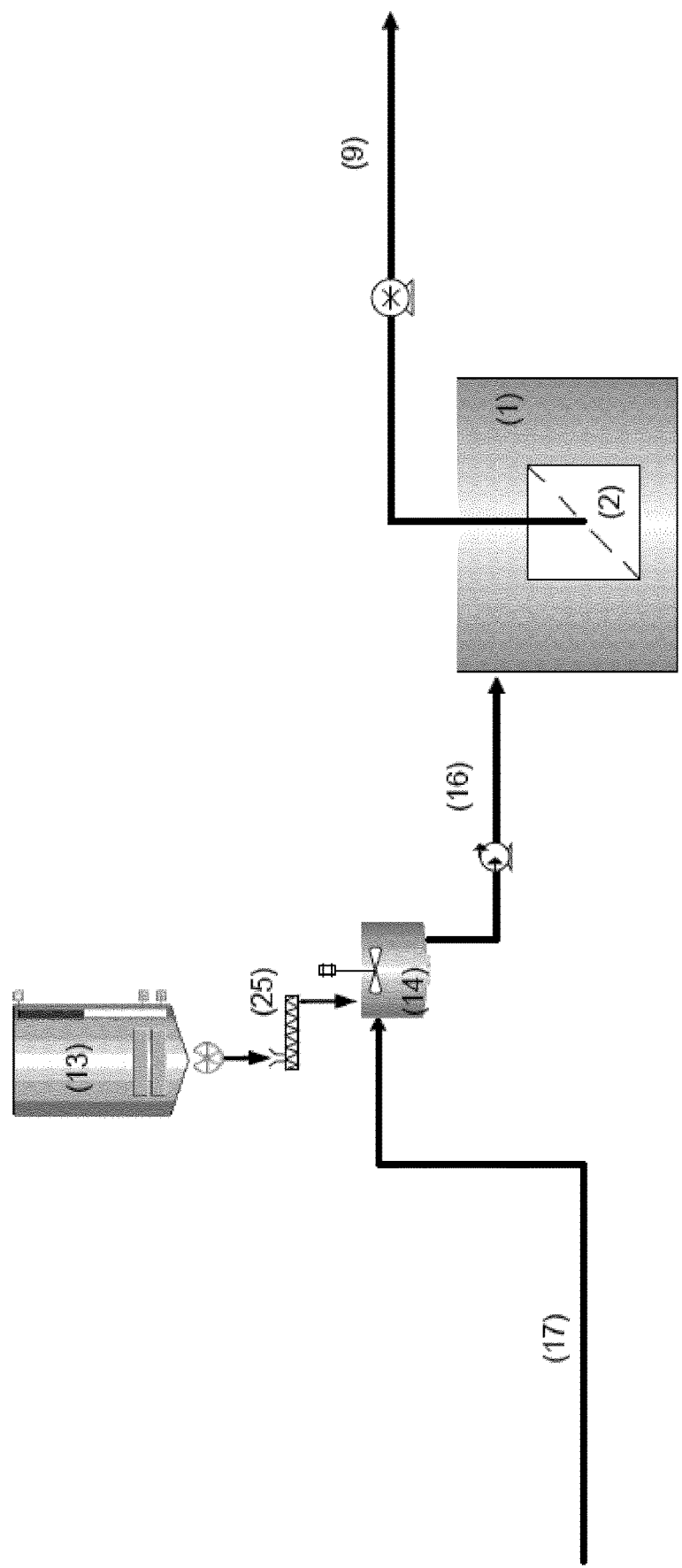
FIG. 6 refers to a schematic illustration of a process comprising a main process flow (17) only and wherein the calcium carbonate is dosed directly in vessel for preparing a suspension of calcium carbonate (14).
Figure 7:
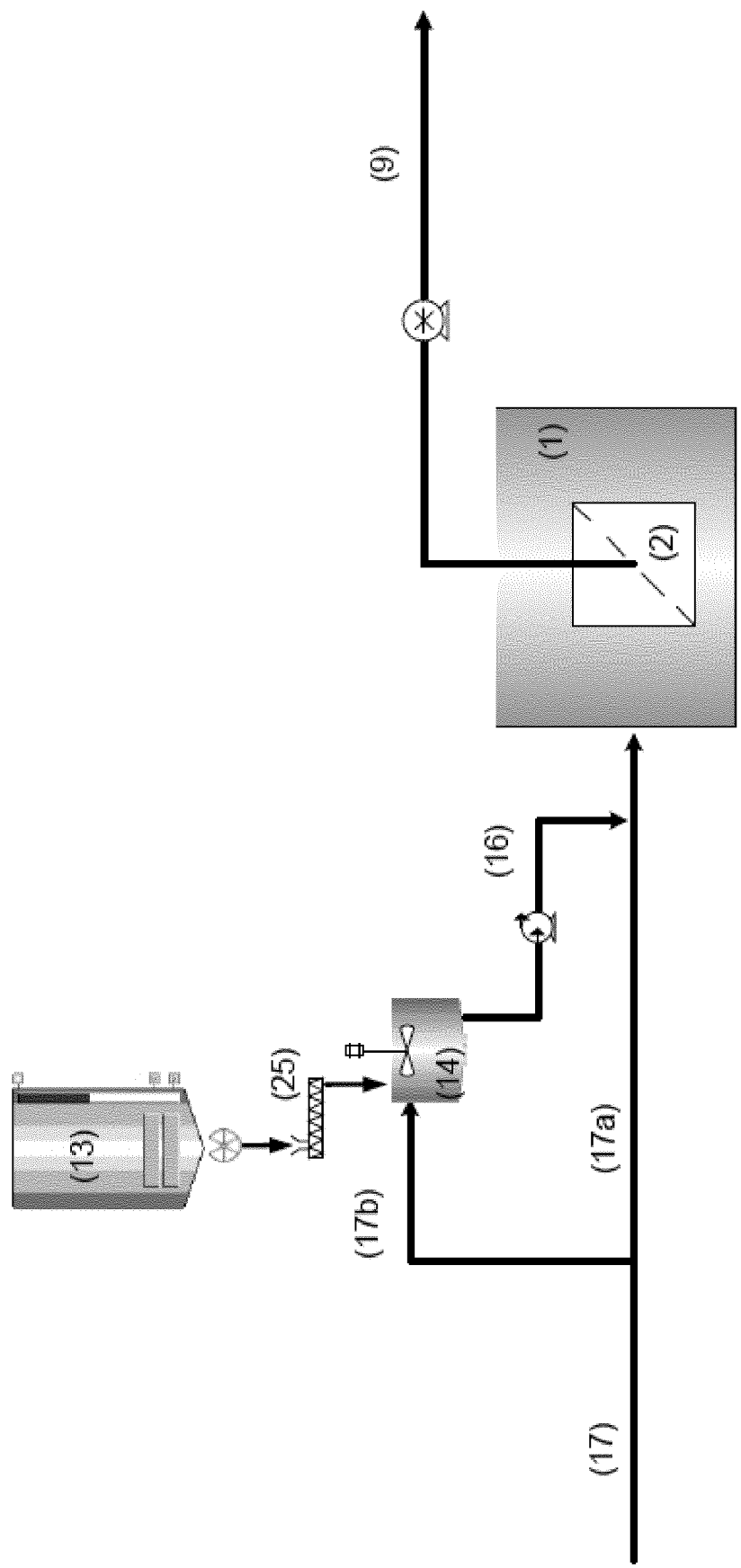
FIG. 7 refers to a schematic illustration of a process comprising a main branch of the main stream (17a) and one side branch of the main stream (17b) wherein the calcium carbonate is dosed into a vessel for preparing a suspension of calcium carbonate (14) which is located in the side branch of the main stream (17b).
Figure 8:
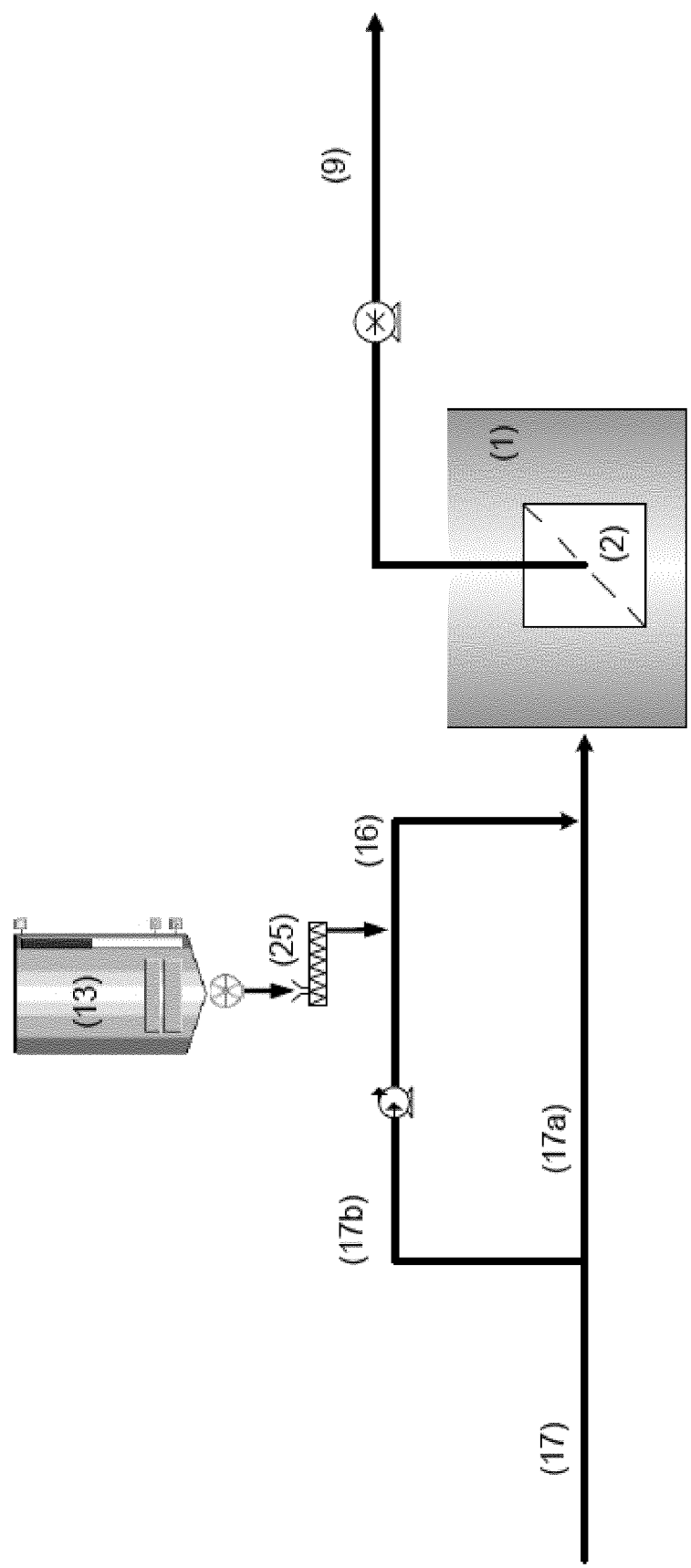
FIG. 8 refers to a schematic illustration of a process comprising a main branch of the main stream (17a) and one side branch of the main stream (17b), wherein the calcium carbonate is dosed directly into the side branch of the main stream (17b).
Figure 9:
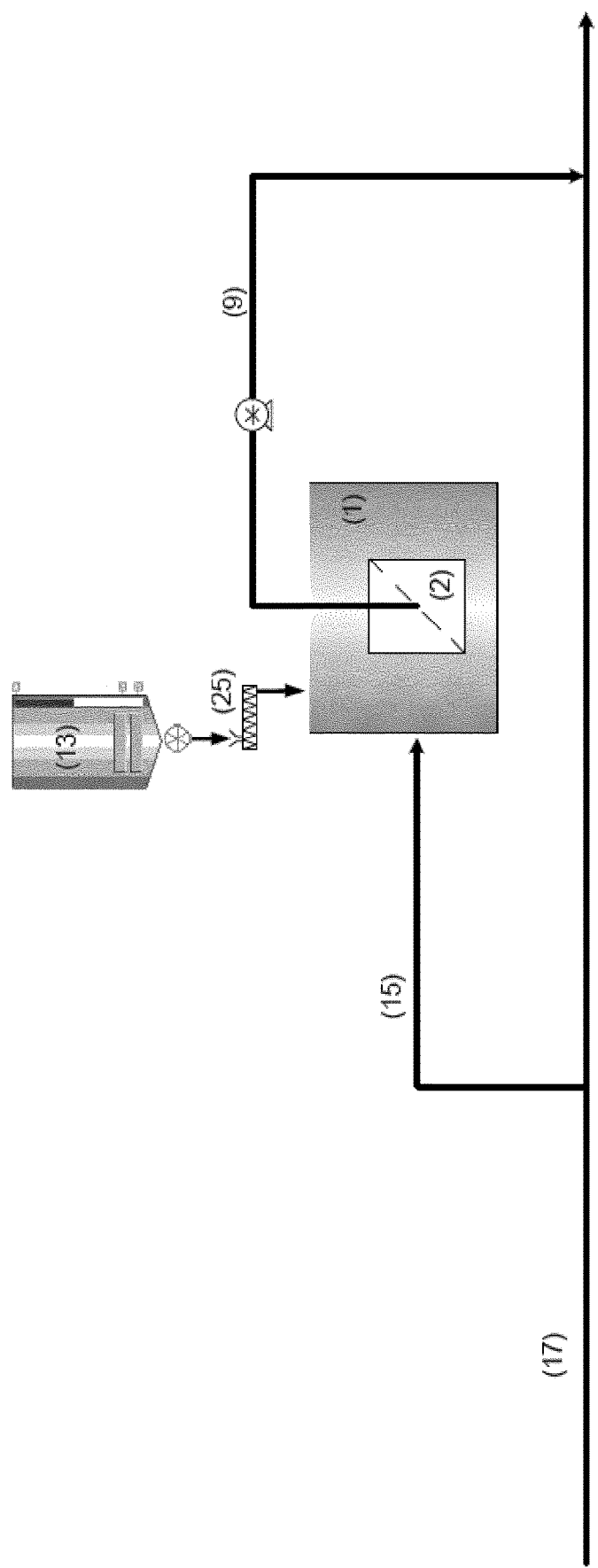
FIG. 9 refers to a schematic illustration of a process comprising a main stream (17) and a side stream (15), wherein the calcium carbonate is dosed into the container (1) comprising the submerged membrane module (2) which is located in the side stream (15).
Figure 10:
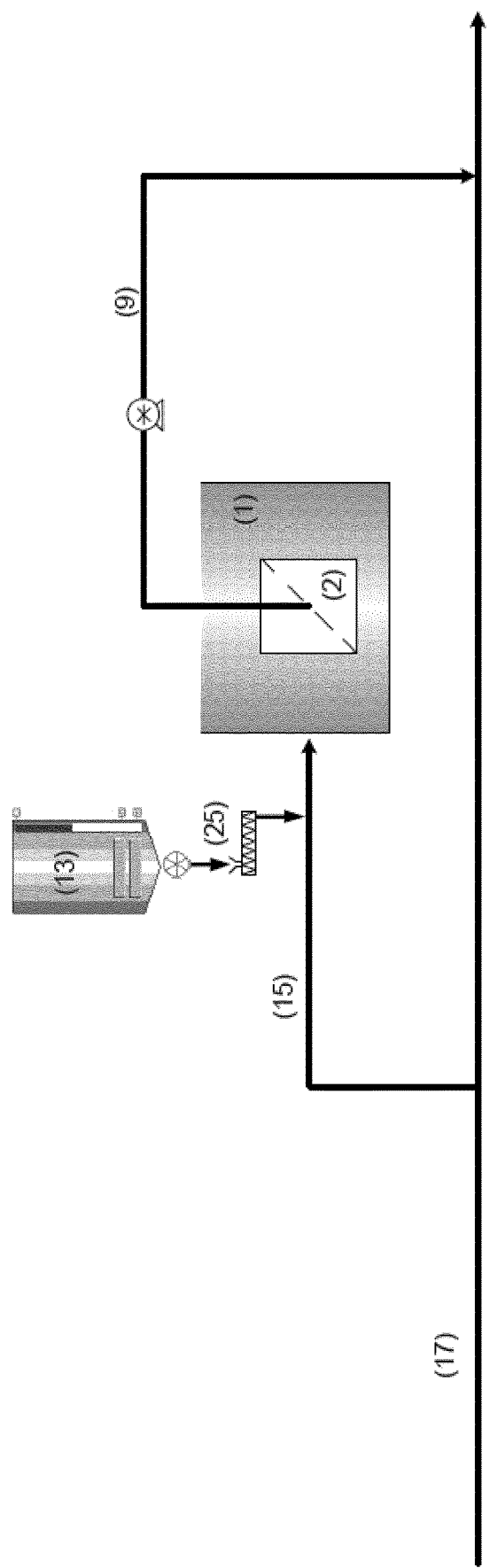
FIG. 10 refers to a schematic illustration of a process comprising a main stream (17) and a side stream (15), wherein the container (1) comprising the submerged membrane module (2) is located in the side stream (15) and the calcium carbonate is dosed into the side stream (15).
Figure 11:
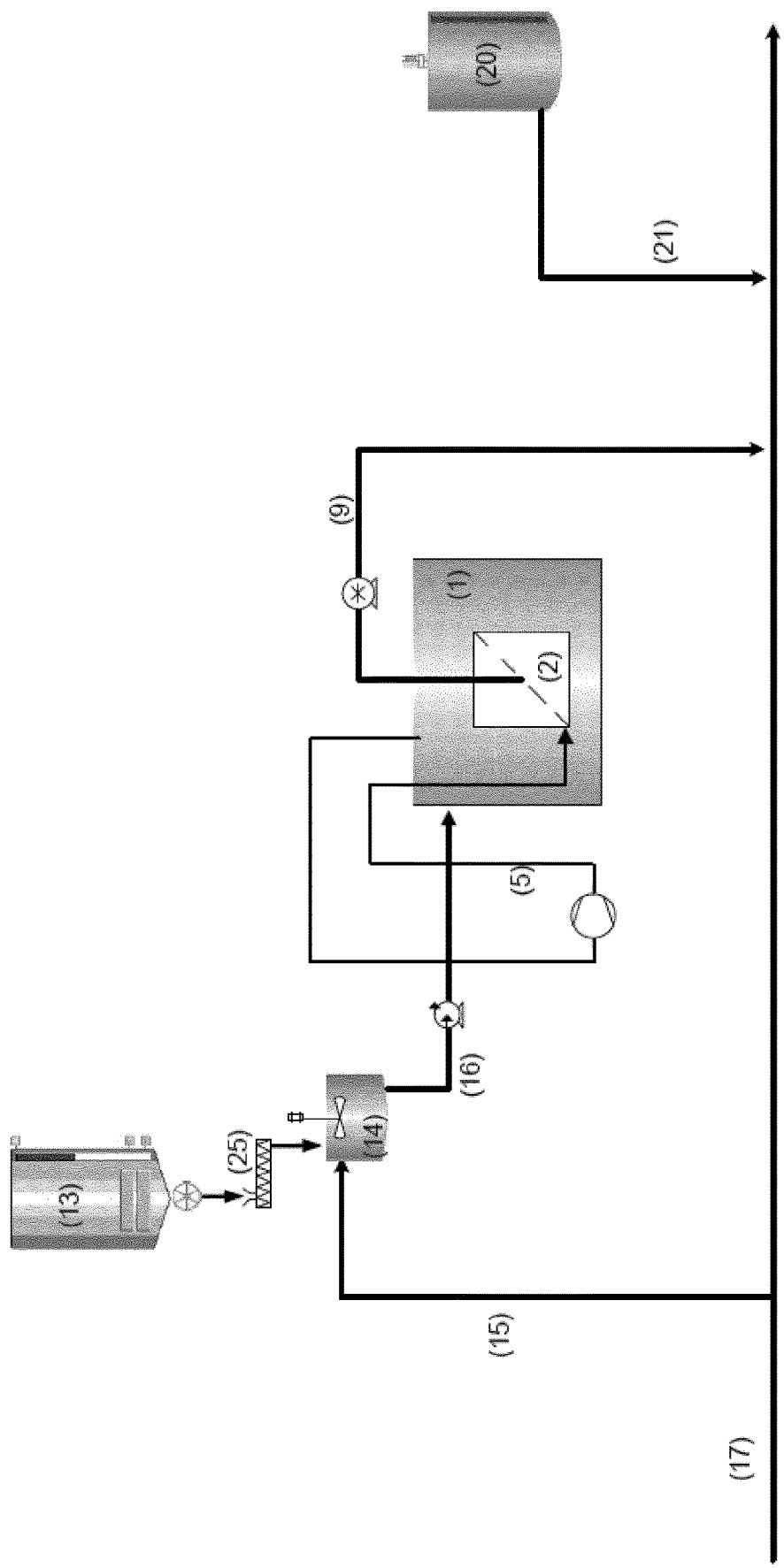
FIG. 11 refers to a schematic illustration of a process comprising a main stream (17) and a side stream (15), wherein the container (1) comprising the submerged membrane module (2) and recirculation air (5) is located in the side stream (15) and the calcium carbonate is dosed into a vessel for preparing a suspension of calcium carbonate (14) which is located in the side stream (15). The illustration further shows the $Ca(OH)_2$ dosing process stream (21).
Figure 12:
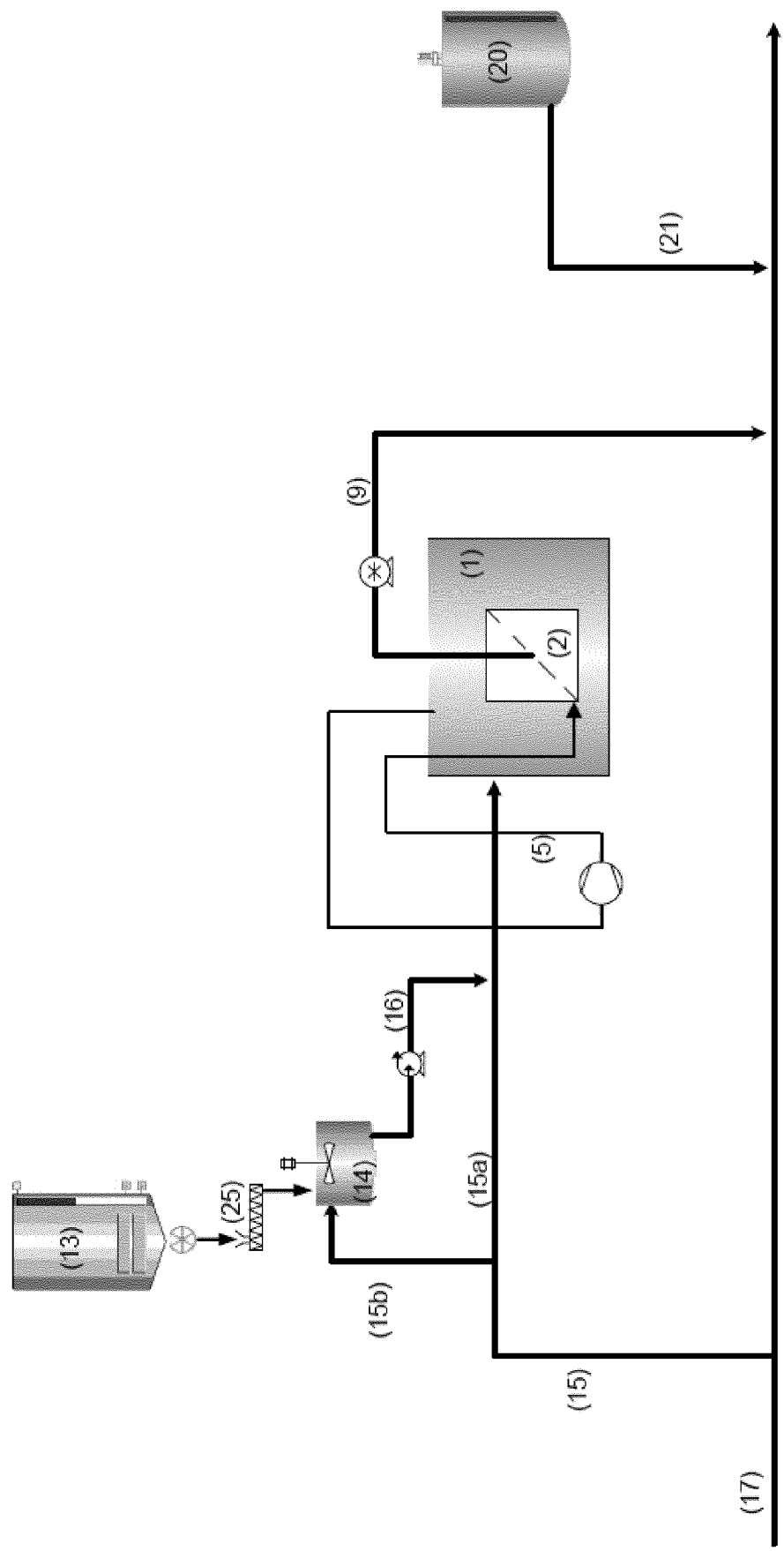
FIG. 12 refers to a schematic illustration of a process comprising a main stream (17) a main branch of the side stream (15a) and a side branch of the side stream (15b), wherein the calcium carbonate is dosed into a vessel for preparing a suspension of calcium carbonate (14) which is located in the side branch of the side stream (15b). The illustration further shows the container (1) comprising the submerged membrane module (2) and recirculation air (5) which is located in the main branch of the side stream (15a) and the $Ca(OH)_2$ dosing process stream (21).
Figure 13:
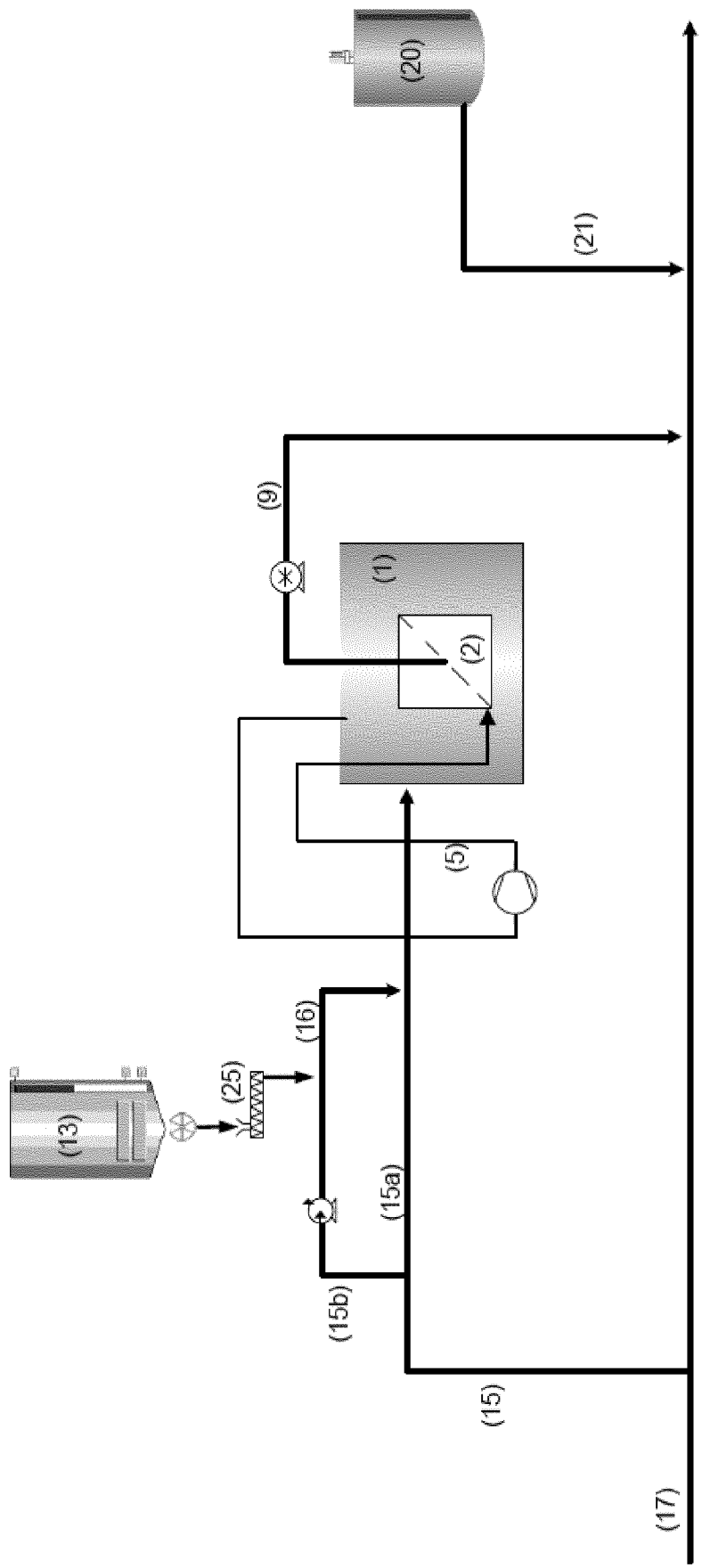
FIG. 13 refers to a schematic illustration of a process comprising a main stream (17) a main branch of the side stream (15a) and a side branch of the side stream (15b), wherein the calcium carbonate is directly dosed into the side branch of the side stream (15b). The illustration further shows the container (1) comprising the submerged membrane module (2) and recirculation air (5) which is located in the main branch of the side stream (15a) and the $Ca(OH)_2$ dosing process stream (21).

Inventive Installation—Preparation and Dosing of Aqueous Solution of Calcium Bi-Carbonate Followed by pH Adjustment, to Increase the Mineral and Alkalinity Content of a Desalinated Water and Stable it with Respect to its Saturation Index A general process flow sheet of one installation according to the present invention is shown in FIG. 3. The installation comprises a reactor tank (1) with a submerged membrane (2) of 50 m² inside, a product storage tank (3), a calcium carbonate storage silo (13) with dosing screw feeder and a vessel for preparing a suspension of the calcium carbonate (14) and a calcium hydroxide storage tank (20) and dosing system.

A calcium hydrogen carbonate solution is produced in an aqueous solution S2 (9) and dosed into the main process flow (17) to increase the mineral content and alkalinity of the main process flow (17). A calcium hydroxide suspension at 5.0 wt.-% and of high purity is dosed (21) in the main process flow (17) after the dosing of the calcium hydrogen carbonate solution to create the desired final water quality of the final treated water stream (24).

Feed water is provided in all process flows, the feed water was obtained from reverse osmosis system, producing water of the following water specification:

Sodium: <1 mg/l
Chloride: <2 mg/l
Calcium: 8 mg/l
Magnesium: <1 mg/l
Alkalinity: 12 mg/l (as CaCO$_3$)
° dH: 1.12
pH: 6.9
Conductivity 24 µS/cm A calcium hydrogen carbonate solution can be produced in a side stream using the above mentioned equipment in the following manner: Reactor tank (1) is originally filled with a calcium carbonate suspension of 5.0 wt.-% at to a defined volume to that covers the submerged membrane's (2) surface measured by level measurement (11) in reactor tank (1). A blower starts recirculating air volume (5) from the top of reactor tank (1) to diffusers located at the bottom of the submerged membranes (2) to ensure a homogenous suspension is maintained within the reactor tank (1) and provide some cleaning effect for the submerged membranes (2). Volume is recirculated at a rate of around 200 times per h. A controlled quantity of carbon dioxide (4) is added in the air stream. Carbon dioxide loaded recirculation air passes over the submerged membranes (2) from the bottom to the top of the reactor tank (1) creating turbulence, and carbon dioxide passes from the air stream to the calcium carbonate suspension increasing the amount of dissolved carbon dioxide within the suspension. The reaction between the calcium carbonate and the dissolved carbon dioxide allows the formation of calcium hydrogen carbonate solution within the reactor tank (1). At the same time, calcium carbonate is added to the vessel (14) from the storage silo (13) for the preparation of a calcium carbonate suspension within the vessel (14). A loss-in-weight screw feeder is used to accurately measure the quantity of calcium carbonate added. Water is also added to the tank and a mixer used to create a homogenous suspension of known solids content. The suspension of micronized calcium carbonate (16) is then transferred to the reactor tank (1) at a rate equal to the amount of calcium carbonate that is dissolved through reaction with the carbon dioxide, so that the total amount of undissolved calcium carbonate within the reactor tank (1) remains constant. An aqueous solution S2 (9) of filtrated permeate as clear concentrated calcium hydrogen carbonate solution is used to add the calcium and bicarbonate to the main process flow (17) via a bi-directional dosing pump. A product storage tank (3) was used as a buffer also for the backwashing sequence every 10 minutes. A second dosing pump was used to add the calcium hydroxide suspension at e.g. position (21) stored in a storage tank (20) to the main process flow (17).

Start-Up Pilot Unit

Natural calcium carbonate powder (Millicarb® from Omya International, Orgon France, d$_{50}$=3 µm) and a calcium hydroxide suspension (Schäferkalk, Precal 72, 20 wt.-% concentration in water) have been used as starting materials in a pilot plant. The Schäferkalk product (Precal 72) is a highly reactive 20 wt.-% calcium hydroxide suspension, for effective pumping it has been diluted to 5 wt.-% (21) and directly dosed into the final treated water stream (24). Reactor tank (1) was filled with 900 l of prepared 5 wt.-% calcium carbonate powder suspension, executed by level measurement (11) in reactor tank 1. Recirculation air stream (5) fan started with 10 m³/h for regeneration of membranes via turbulence. Overpressure of airflow was measured by (6).

Example 3

To produce high loaded concentrate (~250 mg/l alkalinity) 99 g of carbon dioxide (4) was dosed to recirculating air stream within 1 h. Continuous production was started at the end of the 1 h recirculation time. During continuous production a suspension of 250 mg/l micronized calcium carbonate (16) was added to reactor tank (1) to account for the continuous dissolution of calcium carbonate within the reactor tank (1). At the same time a clear aqueous solution (9) was extracted through the submerged membranes (2) with a concentration of 250 mg/l calcium bi-carbonate (measured as calcium carbonate) and discharged via bi-directional dosing pump through the product storage tank (3) in main process flow (17). Both ratios—suspension of micronized calcium carbonate (16) and aqueous solution S2 (9)—were controlled by level measurement (11) in reactor tank (1) and flow measurement (10) of the aqueous solution S2 (9). Primary settings of ratios depend from achievable membrane flux rates and were measured as trans-membrane-pressure (8). Quality of aqueous solution (9) was controlled by turbidity measurement (12) and titrations. Quality of first blend was measured via pH (18), electrical conductivity (19) and titrations. To reach the desired final water quality with a Langelier Saturation Index of 0 for the final treated stream (24), the calcium hydroxide suspension (21) from tank (20) was dosed into the final treated water stream (24) also.

The operating conditions and water quality results are given in Table 5 and Table 6 below.

TABLE 5

Process streams of Example 3.

| Process stream | (15) | (16) | (9) | (21) | (5) | (17) |
|---|---|---|---|---|---|---|
| Description | Raw water side stream | Calcium carbonate suspension | Calcium bi-carbonate solution S2 | Calcium hydroxide suspension | Recirculation air | Main process flow |
| Flow rate (l/h) | 1 250 | 1 250 | 1 250 | 0.42 | 20 000 | 3 750 |
| Solids content (%) | 0 | 0.025 | 0 | 5 | 0 | 0 |
| Concentration (mg/l) | 0 | 0 | 220 | 50 000 | 110 | 20 |

$^a$ Equivalent dosage of carbon dioxide into reactor based on flow rate of water through reactor

TABLE 6

Water Quality Results of Example 3:

| Process stream | (9) | (24) |
|---|---|---|
| Description: | Calcium bi-carbonate solution S2 | Final water |
| Alkalinity (mg/l as $CaCO_3$) | 220 | 88.5 |
| Hardness (mg/l as $CaCO_3$) | 214 | 92.5 |
| pH | 7.4 | 7.95 |
| Temperature [° C.] | 21.5 | 21 |
| Turbidity [NTU] | 0.1 | 0 |

Inventive Example 4: Dissolution of Magnesium Hydroxide by Using the Process Set Out in FIG. 1

4.1 Equipment

The following equipment was used for the tests:
2150 litre "Membrane Calcite Reactor" (MCR) consisting of:
  Cylindrical stainless steel reactor of volume 2150 l with required connections,
  Microdyn Bio-cel BC-50 submerged membrane unit installed inside reactor,
  Lid to seal reactor,
  Instrumentation for level control and pressure monitoring,
  Blower system configured such that it forms a blower recirculation loop, consisting of:
    Blower operated by variable speed drive,
    Feed pipework to blower connected from top of reactor (connected to lid)
    Discharge pipework connected to diffuser manifold at bottom of submerged membrane unit,
  Permeate pump to extract concentrate solution through membrane, with flow meter to measure flow rate
  Carbon dioxide dosing system, consisting of:
    Carbon dioxide bottle
    Pressure regulator to decrease pressure from bottle at 50 bar to 5 bar
    Mass flow meter and control valve to regulate and measure the dosing of carbon dioxide
    Dosing connection to blower discharge pipework
  Slurry Make-Down (SMD) system, consisting of:
    Slurry make-down (SMD) tank with electric mixer and tank level instrumentation,
    Feed water supply to tank, controlled to maintain level within tank
    Loss-in-weight dosing feed system to accurately add required amount of micronized calcium carbonate to the SMD tank,
    Hopper supplying micronized calcium carbonate to the loss-in-weight feeder,
    Slurry feed pump to dose calcium carbonate suspension produced in SMD tank to the 2150 l reactor,
    Dosing hose connecting slurry feed pump and 2150 l reactor
  Magnesium hydroxide dosing system, consisting of:
    Storage tank containing a suspension of 25% magnesium hydroxide
    Prominent Gamma L dosing pump
    Discharge hose from dosing pump connected to dosing hose between slurry feed pump and 2150 l reactor (part of SMD system)
    Magnesium dosing system is configured such that the magnesium hydroxide is dosed into the suspension of micronized calcium carbonate (16).

4.2 Procedure:

The following procedure was used to run the trials:
1. The SMD tank was filled with water and calcium carbonate dosed into the tank to produce a suspension S1 as per the settings provided in Section 4.3.
2. The SMD control was placed into automatic mode so that water would be continually replenished in the SMD tank when suspension was withdrawn from the tank, and calcium carbonate would be continuously dosed to ensure a consistent suspension was generated of concentration provided in Section 4.3.
3. The 2 150 l reactor was filled with a suspension containing 5% of micronized calcium carbonate S1. The technical details of the micronized calcium carbonate are provided in Section 4.3.
4. The lid of the reactor was closed and a tight seal was ensured.
5. The blower was energized to run, keeping the micronized calcium carbonate in suspension S1.

6. Carbon dioxide was dosed into the blower recirculation loop, as per the settings provided in Section 4.3.
7. The permeate pump was operated at a set speed to provide the required flow rate and extract a clear solution S2 from the reactor tank, as per the settings provided in Section 4.3.
8. The slurry feed pump was operated at a set speed to ensure that the level within the reactor tank remains constant.
9. The magnesium hydroxide dosing pump was set to varying speeds to dose the required quantity of magnesium hydroxide into the process as per the test settings provided in Section 4.3.
10. Samples of the concentrated solution S2 extracted by the permeate pump were analysed for the following water qualities by the methods described above:
   a. Alkalinity (in mg/l)
   b. Total hardness (in mg/l)
   c. Magnesium hardness (in mg/l)
   d. Acidity (as mg/l $CO_2$)
   e. pH, conductivity, temperature & turbidity 4.3 Test Settings The following test settings were used during the trials:

TABLE 7

Test setting

| Trial No. | Suspension volume (l) | Blower speed (Nm³/hr) | SMD $CaCO_3$ conc. (mg/l) | Permeate flow rate (l/hr) | $CO_2$ dose rate (mg/l) | $CO_2$ dose rate (g/min) | $Mg(OH)_2$ dose rate (mg/l) | $Mg(OH)_2$ dose (ml/hr) as 25% suspension |
|---|---|---|---|---|---|---|---|---|
| 1 | 1800 | 7.5 | 250 | 3000 | 154 | 7.7 | 0 | 0 |
| 2 | 1800 | 7.5 | 250 | 3000 | 154 | 7.7 | 30 | 308 |
| 3 | 1800 | 7.5 | 250 | 3000 | 154 | 7.7 | 60 | 615 |

4.4 Measured Results

TABLE 8

The results measured for Trial 1:

| pH [—] | Conductivity [µS/cm] | Turbidity [NTU] | Temperature (° C.) | Alkalinity [mg/L] | Total Hardness [mg/L] | Mg Hardness [mg/L] | Acidity [mg/L $CO_2$] |
|---|---|---|---|---|---|---|---|
| 7.3 | 483.0 | 0.01 | 17.8 | 260.2 | 260.2 | −0.49 | 37.0 |
| 7.2 | 496.0 | 0.01 | 18.2 | 260.2 | 263.2 | −0.24 | 37.8 |
| 7.2 | 486.0 | 0.01 | 17.7 | 261.2 | 272.2 | 1.46 | 40.5 |
| 7.3 | 483.0 | 0.01 | 17.5 | 260.7 | 263.2 | −0.24 | 39.6 |
| 7.2 | 487.0 | 0.01 | 16.4 | 263.2 | 258.2 | −1.46 | 44.0 |
| 7.3 | 476.0 | 0.01 | 15.3 | 259.2 | 273.2 | 1.22 | 42.7 |
| 7.3 | 479.0 | 0.01 | 15.4 | 260.2 | 264.2 | 0.00 | 41.8 |

TABLE 9

The results measured for Trial 2:

| pH [—] | Conductivity [µS/cm] | Turbidity [NTU] | Temperature (° C.) | Alkalinity [mg/L] | Total Hardness [mg/L] | Mg Hardness [mg/L] | Acidity [mg/L $CO_2$] |
|---|---|---|---|---|---|---|---|
| 7.3 | 445.0 | 0.01 | 15.4 | 245.7 | 270.2 | 9.72 | 35.2 |
| 7.3 | 446.0 | 0.01 | 15.3 | 248.7 | 271.2 | 14.83 | 30.4 |
| 7.2 | 466.0 | 0.01 | 15.0 | 260.2 | 265.2 | 13.37 | 39.6 |

TABLE 10

The results measured for Trial 3:

| pH [—] | Conductivity [µS/cm] | Turbidity [NTU] | Temperature (° C.) | Alkalinity [mg/L] | Total Hardness [mg/L] | Mg Hardness [mg/L] | Acidity [mg/L $CO_2$] |
|---|---|---|---|---|---|---|---|
| 7.1 | 439.0 | 0.01 | 16.1 | 241.7 | 279.2 | 25.53 | 27.7 |
| 7.2 | 415.0 | 0.01 | 15.2 | 225.2 | 253.2 | 26.01 | 28.6 |
| 7.2 | 424.0 | 0.01 | 15.1 | 230.7 | 255.2 | 24.55 | 27.7 |
| 7.3 | 418.0 | 0.01 | 15.3 | 229.7 | 267.2 | 26.98 | 27.3 |

TABLE 10-continued

The results measured for Trial 3:

| pH [—] | Conductivity [µS/cm] | Turbidity [NTU] | Temperature (° C.) | Alkalinity [mg/L] | Total Hardness [mg/L] | Mg Hardness [mg/L] | Acidity [mg/L $CO_2$] |
|---|---|---|---|---|---|---|---|
| 7.2 | 420.0 | 0.01 | 14.9 | 229.2 | 267.2 | 26.98 | 27.7 |
| 7.2 | 415.0 | 0.01 | 14.4 | 229.7 | 257.2 | 23.58 | 28.2 |
| 7.3 | 420.0 | 0.01 | 17.8 | 229.2 | 258.2 | 27.23 | 26.4 |

The results provided for Trial 1 (Table 8) show that very stable values can be generated for the alkalinity of the concentrated solution S2 without magnesium hydroxide dosing. Stable values are also generated for the total hardness and magnesium concentrations.

The results provided for Trial 2 (Table 9) show that the dosing of 30 mg/l of magnesium hydroxide provide between about 10-14 mg/l of magnesium. This is as expected as magnesium hydroxide has a molecular weight of 58.3 g/mol, of which magnesium is 24.3 g/mol, or 41.7% of this amount.

Figure 14:
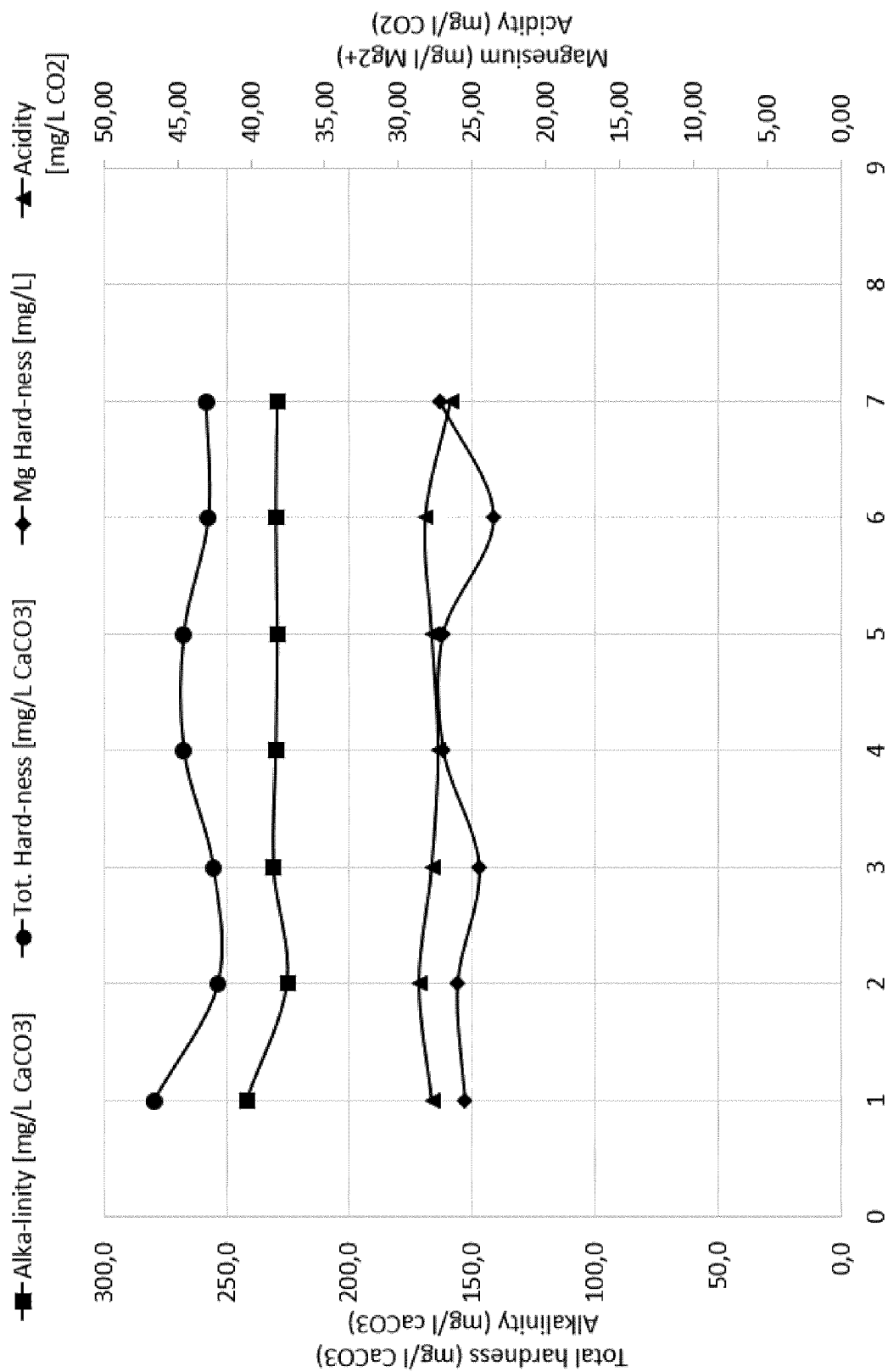
FIG. 14 refers to a graph results generated in Trial 3—Example Dissolution of magnesium hydroxide using the process according to the invention.

The results provided for Trial 3 (Table 10) show that over the course of the experiment, very stable results were achieved for all values, in particular alkalinity and magnesium concentrations. For this trial, 60 mg/l of magnesium hydroxide were dosed. This should ideally add a 25 mg/l of $Mg^{2+}$ ions. This is in line with the results which demonstrate an average of 25.8 mg/l magnesium in the concentrated stream extracted from the reactor, with of range of between 23.6-27.2 mg/l magnesium. The results are also outlined in FIG. 14.

In all cases, the turbidity of the concentrated stream was measured to be 0.01 NTU.

CONCLUSION

From these trials, it can be gathered that the inventive process, that has been developed for the dissolution of micronized calcium carbonate, can be used to effectively dissolve magnesium also—in the form of magnesium hydroxide. The results were very stable demonstrating that the process can also be accurately controlled. This method has the advantage that it produces a concentrated stream void of turbidity in the absence of unwanted anions.

In summary, it has been shown that this process provides a cost effective alternative to current processes. Furthermore, the process can be effectively controlled to dose the desired amount of calcium and, if desired, magnesium.

The invention claimed is:

1. A process for the preparation of an aqueous solution comprising at least one earth alkali hydrogen carbonate, comprising the steps of:
   a) providing water;
   b) providing at least one earth alkali carbonate-comprising material;
   c) providing $CO_2$ or an acid having a $pK_a$-value <5;
   d) combining the water of step a) with the at least one earth alkali carbonate-comprising material of step b) and the $CO_2$ or acid of step c) in any order such as to obtain an aqueous suspension S1 comprising at least one earth alkali hydrogen carbonate;
   e) filtering at least a part of the aqueous suspension S1 obtained in step d) by passing the aqueous suspension S1 through at least one submerged membrane module in order to obtain an aqueous solution S2 comprising at least one earth alkali hydrogen carbonate, wherein the at least one submerged membrane module is located in a container; and
   wherein process steps d) and e) are carried out in the same container and air or process fluid is recirculated across at least a part of the surface of the at least one submerged membrane module.

2. The process according to claim 1, wherein step d) comprises the steps of
   i1) combining the water of step a) with the $CO_2$ or acid of step c), and i2) combining the mixture of i1) with the at least one earth alkali carbonate-comprising material of step b); or
   ii1) combining the water of step a) with the at least one earth alkali carbonate-comprising material of step b), and ii2) combining the mixture of ii1) with the $CO_2$ or acid of step c).

3. The process according to claim 1, wherein process steps d) and e) are carried out in a reactor tank.

4. The process according to claim 1, wherein the at least one submerged membrane module has a pore size of <1 µm.

5. The process according to claim 1, wherein air or process fluid is recirculated from the bottom to top direction of the at least one submerged membrane module and/or container.

6. The process according to claim 1, wherein the container is sealed and air at the top of the container is used as the feed and reintroduced at the bottom of the container.

7. The process according to claim 1, wherein the process comprises a further step f) of backwashing the at least one submerged membrane module with water, optionally $CO_2$ or an acid having a $pK_a$-value <5 is added to the water.

8. The process according to claim 1, wherein the at least one earth alkali carbonate-comprising material of step b) is selected from the group consisting of precipitated calcium carbonate, modified calcium carbonate, ground calcium carbonate and mixtures thereof.

9. The process according to claim 1, wherein the at least one earth alkali carbonate-comprising material of step b) is ground calcium carbonate being selected from the group consisting of marble, limestone, chalk and mixtures thereof.

10. The process according to claim 1, wherein the at least one earth alkali carbonate-comprising material of step b) is provided in dry form or in form of an aqueous suspension; and/or the at least one earth alkali hydrogen carbonate obtained in step d) comprises calcium hydrogen carbonate.

11. The process according to claim 1, wherein the acid provided in step c) has a $pK_a$-value <4 and/or the acid is selected from the group consisting of sulfuric acid, hydrochloric acid, nitric acid or citric acid and/or mixtures thereof.

12. The process according to claim 1, wherein the aqueous solution S2 comprising at least one earth alkali hydrogen carbonate obtained in step e) has an earth alkali concentration as earth alkali hydrogen carbonate in the range from 20 to 1 000 mg/l; and/or has a pH-value in the range from 6.1 to 8.9.

13. A process for the mineralization and/or stabilization of water, the process comprises the steps of
- (i) providing water to be mineralised,
- (ii) providing an aqueous solution comprising at least one earth alkali hydrogen carbonate obtained by the process as defined in claim 1,
- (iii) combining the water to be mineralised of step (i) and the aqueous solution comprising at least one earth alkali hydrogen carbonate of step (ii) in order to obtain mineralised water.

14. The process according to claim 13, comprising a further step (iv) of adding a base to the mineralised water of step (iii).

15. Use of an aqueous solution comprising at least one earth alkali hydrogen carbonate obtained by the process according to claim 1 for the mineralization and/or stabilization of water or as mineralized water.

16. The use according to claim 15, wherein the water is desalinated or naturally soft water.

17. The process of claim 4, wherein the pore size is <0.1 μm.

18. The process of claim 5, wherein $CO_2$ or acid of step c) is added to the air or process fluid.

19. The process of claim 8, wherein the at least one earth alkali carbonate comprising material in step b) is ground calcium carbonate.

20. The process of claim 10, wherein the at least one earth alkali hydrogen carbonate obtained in step d) consists of calcium hydrogen carbonate.

* * * * *